United States Patent
Fox et al.

(10) Patent No.: US 11,110,407 B2
(45) Date of Patent: Sep. 7, 2021

(54) APPARATUS FOR DISSOLVING GAS INTO A LIQUID

(71) Applicant: OXY SOLUTIONS AS, Oslo (NO)

(72) Inventors: Seth Fox, Atchison, KS (US); Arild Hermansen, Oslo (NO); Mahmood Amiry-Moghaddam, Oslo (NO); Hege Ugland, Stabekk (NO); Camilla Haglerød, Hølen (NO)

(73) Assignee: OXY SOLUTIONS AS, Oslo (NO)

( * ) Notice: Subject to any disclaimer, the term of this patent is extended or adjusted under 35 U.S.C. 154(b) by 208 days.

(21) Appl. No.: 15/524,547

(22) PCT Filed: Nov. 5, 2015

(86) PCT No.: PCT/GB2015/053348
§ 371 (c)(1),
(2) Date: May 4, 2017

(87) PCT Pub. No.: WO2016/071691
PCT Pub. Date: May 12, 2016

(65) Prior Publication Data
US 2017/0341038 A1  Nov. 30, 2017

(30) Foreign Application Priority Data

Nov. 7, 2014 (GB) .................................. 1419880
Jun. 12, 2015 (GB) .................................. 1510334

(51) Int. Cl.
*B01F 3/04* (2006.01)
*B01F 15/00* (2006.01)
(Continued)

(52) U.S. Cl.
CPC ...... *B01F 3/04503* (2013.01); *B01F 3/04985* (2013.01); *B01F 5/0652* (2013.01);
(Continued)

(58) Field of Classification Search
CPC ............ B01F 13/0059; B01F 15/00136; B01F 15/00155; B01F 15/00162; B01F 15/0022;
(Continued)

(56) References Cited

U.S. PATENT DOCUMENTS 3,403,001 A    9/1968   Mas et al.
3,590,058 A    6/1971   Lemaster
(Continued)

FOREIGN PATENT DOCUMENTS

AU    730780 B2    3/2001
CN    1089883 A    7/1994
(Continued)

OTHER PUBLICATIONS

PlumbingSupply.com "Pump Controller Index" published Nov. 11, 2011 accessed at <https://web.archive.org/web/20111111105303/https://www.plumbingsupply.com/index-pump-controllers.html> (Year: 2011).*
(Continued)

*Primary Examiner* — Stephen Hobson
(74) *Attorney, Agent, or Firm* — Withrow & Terranova, P.L.L.C.; Vincent K. Gustafson

(57) ABSTRACT

An apparatus (2) for dissolving a gas into a liquid includes a liquid inlet (4) for supplying liquid into the apparatus, a gas inlet (6) for supplying gas into the liquid within the apparatus and a venturi (52) arranged to dissolve the gas into the liquid passing through the venturi. The apparatus also includes an outlet (18) for the liquid and dissolved gas downstream of the venturi. At least part of the liquid inlet, at least part of the gas inlet, at least part of the venturi and at least part of the outlet are formed in an integrally formed piece of material (42).

20 Claims, 10 Drawing Sheets

(51) Int. Cl.
*B01F 5/10* (2006.01)
*B01F 13/00* (2006.01)
*B01F 5/06* (2006.01)
*B01F 13/10* (2006.01)

(52) U.S. Cl.
CPC ............ *B01F 5/0655* (2013.01); *B01F 5/106* (2013.01); *B01F 13/0059* (2013.01); *B01F 13/1022* (2013.01); *B01F 15/0022* (2013.01); *B01F 15/00136* (2013.01); *B01F 15/00155* (2013.01); *B01F 15/00162* (2013.01); *B01F 15/00175* (2013.01); *B01F 15/00227* (2013.01); *B01F 15/00285* (2013.01)

(58) Field of Classification Search
CPC ............ B01F 15/00285; B01F 3/04985; B01F 3/04503; B01F 3/04; B01F 5/106; B01F 15/00227; B01F 5/0652; B01F 15/00175; B01F 13/1022; B01F 5/0655; C12M 29/06
See application file for complete search history.

(56) References Cited

U.S. PATENT DOCUMENTS

| | | | | |
|---|---|---|---|---|
| 3,655,050 | A | * | 4/1972 | Fifer ..................... C02F 3/1242 210/86 |
| 3,816,515 | A | | 6/1974 | Kelham |
| 3,920,550 | A | * | 11/1975 | Farrell, Jr. ............ C02F 3/1242 210/86 |
| 4,059,415 | A | | 11/1977 | Kosaka et al. |
| 4,163,712 | A | | 8/1979 | Smith |
| 4,440,645 | A | | 4/1984 | Kite |
| 4,975,154 | A | * | 12/1990 | Palmer ................. B01D 1/0082 137/392 |
| 5,310,485 | A | * | 5/1994 | Roshanravan ............ C02F 3/28 210/603 |
| 5,858,069 | A | * | 1/1999 | Harrison ................... C02F 3/26 95/154 |
| 6,465,243 | B2 | * | 10/2002 | Okada .................... C12M 29/02 422/105 |
| 7,060,186 | B2 | * | 6/2006 | Petering .................. C02F 3/302 210/259 |
| 9,101,928 | B2 | * | 8/2015 | Mehta .................. C12Q 1/6869 |
| 9,248,421 | B2 | * | 2/2016 | Lee ....................... B01L 3/5027 |
| 9,381,477 | B2 | * | 7/2016 | Karnik ................. B01F 13/0059 |
| 10,005,682 | B1 | * | 6/2018 | Hengsperger ......... B01F 5/0065 |
| 2002/0096792 | A1 | | 7/2002 | Valela et al. |
| 2004/0004042 | A1 | | 1/2004 | Hadley et al. |
| 2004/0131514 | A1 | | 7/2004 | Liou |
| 2004/0251566 | A1 | * | 12/2004 | Kozyuk ................ B01F 5/0646 261/76 |
| 2006/0199260 | A1 | * | 9/2006 | Zhang ............... B01L 3/502723 435/293.1 |
| 2007/0278327 | A1 | * | 12/2007 | Wolfe .................... B01F 5/0077 239/398 |
| 2008/0211118 | A1 | * | 9/2008 | Wyse ...................... F17C 11/00 261/75 |
| 2010/0027372 | A1 | * | 2/2010 | Ozawa ................. B01F 3/0807 366/341 |
| 2010/0147690 | A1 | * | 6/2010 | Audunson ............ A01K 63/042 204/557 |
| 2010/0303676 | A1 | | 12/2010 | Seeley et al. |
| 2011/0115105 | A1 | * | 5/2011 | Burns .................... B01F 5/0068 261/76 |
| 2012/0181711 | A1 | | 7/2012 | Kang et al. |
| 2012/0301209 | A1 | | 11/2012 | Fattori |
| 2015/0125400 | A1 | * | 5/2015 | van Hoeve .......... B01J 19/0093 424/9.52 |
| 2015/0164787 | A1 | * | 6/2015 | Kheir .................. B01F 3/04453 424/489 |
| 2016/0215246 | A1 | * | 7/2016 | Goh ....................... C12M 23/58 |
| 2017/0087522 | A1 | * | 3/2017 | Maeda ............... B01F 15/00344 |
| 2017/0121663 | A1 | * | 5/2017 | Hinojosa ........... B01L 3/502715 |
| 2017/0128887 | A1 | * | 5/2017 | Kashihara ............ B01D 17/047 |
| 2018/0326390 | A1 | * | 11/2018 | Jovanovic ........... B01J 19/0093 |
| 2019/0136177 | A1 | * | 5/2019 | Agrawal ................ C12M 23/20 |
| 2019/0144914 | A1 | * | 5/2019 | Pulitzer ............... B01L 3/50273 435/32 |
| 2019/0282973 | A1 | * | 9/2019 | Stride .................. A61K 49/226 |
| 2020/0060314 | A1 | * | 2/2020 | Long .................... B01F 7/00916 |
| 2020/0308032 | A1 | * | 10/2020 | Domrese ............ B01F 3/04503 |
| 2020/0330932 | A1 | * | 10/2020 | Chien .................. B01F 3/04262 |
| 2021/0023512 | A1 | * | 1/2021 | Horns ................. B01F 15/0261 |

FOREIGN PATENT DOCUMENTS

| | | | |
|---|---|---|---|
| DE | 19740319 A1 | 6/1998 | |
| EP | 0127999 A1 | 12/1984 | |
| EP | 0152201 A2 * | 8/1985 | ............ B01F 3/0876 |
| EP | 0152201 A2 | 8/1985 | |
| FR | 2699425 A1 | 6/1994 | |
| GB | 2514202 A | 11/2014 | |
| JP | S4970459 A | 7/1974 | |
| JP | S60222136 A | 11/1985 | |
| JP | 2004188246 A | 7/2004 | |
| JP | 2009119308 A | 6/2009 | |
| JP | 2011088050 A | 5/2011 | |
| JP | 2014076425 A | 5/2014 | |
| RU | 2246336 C2 | 2/2005 | |
| RU | 2457898 C2 | 8/2012 | |
| RU | 2012136778 A | 3/2014 | |
| WO | 8101700 A1 | 6/1981 | |
| WO | 9427919 A1 | 12/1994 | |
| WO | 2004069764 A2 | 8/2004 | |
| WO | 2013116893 A1 | 8/2013 | |

OTHER PUBLICATIONS

Bowers, John, S., "Sparger and Surface Gas Transfer for Cell Culture Bioreactors," Annual Meeting of the American Electrophoresis Society, Nov. 2007, Philadelphia, Pennsylvania, Omnipress, 12 pages.

Chalmers, Jeffrey, J., "Cells and bubbles in sparged bioreactors," Cytotechnology, vol. 15, 1994, Kluwer Academic Publishers, pp. 311-320.

Christi, Yusuf, "Animal-cell damage in sparged bioreactors," Tibtech, vol. 18, Oct. 2000, Elsevier Science Ltd., pp. 420-432.

Garcia-Ochoa, Felix, et al., "Prediction of Gas-Liquid Mass Transfer Coefficient in Sparged Stirred Tank Bioreactors," Biotechnology and Bioengineering, vol. 92, Issue 6, Dec. 20, 2005, Wiley Periodicals, Inc., pp. 761-772.

Hilal-Alnaqbi, Ali, et al., "Experimental evaluation and theoretical modeling of oxygen transfer rate for the newly developed hollow fiber bioreactor with three compartments," Bio-Medical Materials and Engineering, vol. 23, 2013, IOS Press, pp. 387-403.

Hollinshead, Whitney, et al., "Biofuel production: an odyssey from metabolic engineering to fermentation scale-up," Frontiers in Microbiology, vol. 5, Jul. 2014, 8 pages.

Klockner, Wolf, et al., "Correlation between mass transfer coefficient kLa and relevant operating parameters in cylindrical disposable shaken bioreactors on a bench-to-pilot scale," Journal of Biological Engineering, vol. 7, Issue 28, 2013, BioMed Central Ltd., 14 pages.

Olle, Bernat, et al., "Novel and New Concept to Increase Oxygen Transfer in Bioreactors," Massachusetts Institute of Technology, 2008, 12 pages.

Volkmer, Elias, et al., "Overcoming hypoxia in 3D culture systems for tissue engineering of bone in vitro using an automated, oxygen-triggered feedback loop," Journal of Materials Science, vol. 23, 2012, Springer, pp. 2793-2801.

International Search Report and Written Opinion for PCT/GB2015/053348, dated Feb. 22, 2016, 11 pages.

Search Report for United Kingdom Patent Application No. 1419880.8, dated May 6, 2015, 4 pages.

Search Report for United Kingdom Patent Application No. 1510334.4, dated Aug. 12, 2015, 5 pages.

(56) References Cited

OTHER PUBLICATIONS

Notification of Reasons for Rejection for Japanese Patent Application No. 2017-544053, dated Jul. 30, 2019, 18 pages including English translation.
Office Action for Russian Patent Application No. 2017115832/05, dated Apr. 12, 2019, 15 pages.
First Office Action in Chinese Patent Application No. 201580063977.0 dated Nov. 5, 2019 (18 pages including English machine translation).
Office Action (Communication pursuant to Article 94(3) EPC) in European Patent Application No. 15794243.4 dated Feb. 26, 2021 (5 pages).

* cited by examiner

APPARATUS FOR DISSOLVING GAS INTO A LIQUID

This application is a 35 U.S.C. § 371 national phase filing of International Application No. PCT/GB2015/053348 filed on Nov. 5, 2015, and further claims priority to United Kingdom Patent Application No. 1419880.8 filed on Nov. 7, 2014, and United Kingdom Patent Application No. 1510334.4 filed on Jun. 12, 2015, with the contents of the foregoing applications hereby being incorporated by reference herein in their respective entireties.

This invention relates to an apparatus for dissolving gas into a liquid, e.g. for the oxygenation of a liquid, in particular to an apparatus for the production of a liquid having gas dissolved therein, e.g. an oxygenated liquid, for use in a bioreactor, e.g. a small scale bioreactor.

Bioreactors, which can be used to culture cells or organisms in a liquid, often require oxygen to be added to the liquid, e.g. for aerobic fermentation and biomedicine production, or require a liquid to be deoxygenated by dissolving a different gas into the liquid, e.g. for anaerobic fermentation. A common technique used to add oxygen or other gas to the liquid is that of gas sparging in which the oxygen or other gas is bubbled through the liquid such that some of the oxygen or other gas is dissolved into the liquid, from where it can be used by the cells or organisms, for example.

However, there are a number of problems associated with gas sparging, particularly in bioreactors. One problem is that owing to, e.g. oxygen's, poor solubility in, e.g., water, the amount of oxygen able to be dissolved in the liquid is lower, e.g. approximately 30 mg/l at 37 degrees Celsius, than the ideally desired level of oxygen for the culture of cells or organisms, thus limiting the production of the cells or organisms being cultured.

A second problem is that the poor solubility of the, e.g. oxygen, in the liquid means that a large number of bubbles have to be injected into the liquid to attempt to oxygenate, or dissolve the gas into, the liquid as well as possible. However, the presence of a large number of bubbles passing through the liquid in the bioreactor disturbs the cells or organisms present in the liquid, again limiting the production, and in some cases leading to the death, of the cells or organisms being cultured.

A third problem is that the production of bubbles through the bioreactor creates foam which can trigger infections from exogenous bacteria, for example, which again disrupts the culture of the cells or organisms in the bioreactor.

The aim of the present invention is to provide an improved apparatus and method for dissolving a gas into, e.g. oxygenating, a liquid.

When viewed from a first aspect the invention provides an apparatus for oxygenating a liquid comprising:

a liquid inlet for supplying liquid into the apparatus;

an oxygen inlet for supplying oxygen into the liquid within the apparatus, the oxygen inlet being in fluid communication with, and downstream of, the liquid inlet;

a venturi in fluid communication with, and downstream of, the liquid inlet and the oxygen inlet, wherein the venturi is arranged to dissolve the oxygen into the liquid passing through the venturi; and an outlet for the oxygenated liquid in fluid communication with, and downstream of, the venturi;

wherein at least part of the liquid inlet, at least part of the oxygen inlet, at least part of the venturi and at least part of the outlet are formed in an integrally formed piece of material.

The present invention relates to an apparatus that oxygenates a liquid passing through the apparatus. The apparatus comprises liquid and oxygen inlets and an outlet, with a venturi therebetween. Liquid and oxygen are supplied into the apparatus via the respective inlets, the oxygen inlet being positioned downstream of the liquid inlet such that the oxygen is injected into the liquid stream. This liquid and oxygen mixture is then passed to a venturi, e.g. via a conduit in fluid communication with, and downstream of, the liquid inlet and the oxygen inlet, the conduit being arranged to supply the liquid and the oxygen to the venturi. Owing to the restriction the venturi creates in the flow path, this causes the liquid and oxygen mixture to accelerate through the venturi and then decelerate at the other side, generating a shockwave in the liquid and oxygen mixture which forces the oxygen to dissolve in the liquid, thus oxygenating the liquid.

The oxygenated liquid is then output from the apparatus through an outlet, where it can be used in a downstream device, e.g. a bioreactor, for subsequent use, e.g. the culture of cells. Owing to the oxygen having been dissolved into the liquid before it is supplied to the consuming device, e.g. a bioreactor, the aforementioned problems associated with the presence of bubbles disturbing the cells in the bioreactor, for example, are avoided and a higher concentration of dissolved oxygen is achieved using the apparatus of the present invention compared with conventional sparging.

The main body of the apparatus is provided as an integrally formed piece of material in which some or all of the liquid inlet, at least part of the oxygen inlet, at least part of the venturi and at least part of the outlet are formed in the integrally formed piece of material (e.g. the components are provided as an open or closed channel in the integrally formed piece of material). Providing these main components of the apparatus in the same integrally formed piece of material allows a compact apparatus to be provided that does not contain multiple individually manufactured components, e.g. which need to be connected together with tubes. Thus the apparatus can simply be connected between a liquid source, an oxygen source and the device to which the oxygenated liquid is being supplied, e.g. to provide an inline system. Thus preferably the apparatus comprises a liquid source in fluid communication with the liquid inlet and/or an oxygen source in fluid communication with the oxygen inlet. The apparatus may comprise a plurality of liquid sources, each in fluid communication with the liquid inlet (or a plurality of liquid inlets), to allow different types of liquid to be supplied to the apparatus.

The, e.g. compact, apparatus is preferably portable, such that it is suitable for use in small scale applications, e.g. laboratory based systems, where it can be plugged into the necessary components, as described above, e.g. for supplying the oxygenated liquid to a small scale bioreactor or other consuming device.

The apparatus may comprise only a single venturi. However in one set of embodiments the apparatus comprises a plurality of venturis in fluid communication with, and downstream of, the liquid inlet and the oxygen inlet, wherein the venturis are arranged to dissolve the oxygen into the liquid passing through the venturis, and at least part of the venturis are formed in an integrally formed piece of material. Providing multiple venturis increases the flow rate capacity of the device and may increase the amount of oxygen which is dissolved in the liquid and thus the concentration of dissolved oxygen in the liquid output from the apparatus.

The plurality of venturis may be arranged in series and/or parallel with each other. In the embodiment in which the venturis are arranged in parallel with each other the apparatus may comprise one or more valves, each valve in fluid communication with, and upstream or downstream of, a respective venturi. Thus each valve is arranged to open or close to allow the liquid and the oxygen to flow through its respective venturi. Thus, by controlling the number of valves that are open or closed, the flow rate of the liquid through the apparatus can be controlled.

The one or more venturis may take any suitable and desired form, e.g. dependent on the size of the device and the desired degree of oxygenation. In one embodiment the length of the venturi, i.e. the length of the restriction in the flow path, is preferably between 5 mm and 150 mm, e.g. between 10 mm and 80 mm, e.g. between 20 mm and 40 mm, e.g. approximately 30 mm. The cross section of the venturi, i.e. in a plane perpendicular to the direction of the flow path through the venturi, has a shape which may comprise a circle, an oval, a rectangle, or any other suitable and desired shape. The depth of the venturi, i.e. minimum dimension in a direction substantially perpendicular to the direction of the flow path through the venturi, is preferably between 0.01 mm and 10 mm, e.g. between 0.05 mm and 5 mm, e.g. between 0.1 mm and 2 mm, e.g. approximately 1 mm. The width of the venturi, i.e. the maximum dimension in a direction substantially perpendicular to the direction of the flow path through the venturi, and generally substantially perpendicular to the depth of the venturi, is preferably between 1 mm and 50 mm, e.g. between 5 mm and 20 mm, e.g. approximately 15 mm.

In one embodiment the apparatus comprises a diffusion chamber in fluid communication with, and downstream of, the oxygen inlet (and also the liquid inlet), the diffusion chamber and the oxygen inlet being arranged such that the oxygen is supplied through the oxygen inlet into the diffusion chamber. The diffusion chamber provides a volume through which the liquid flows and into which the oxygen is injected, with the diffusion chamber being arranged to promote the break-up of bubbles of oxygen into smaller bubbles, e.g. by encouraging turbulent flow of the liquid and the oxygen in the diffusion chamber. Preferably a grid or mesh, e.g. made from glass, metal or plastic, is arranged in the diffusion chamber, e.g. through which the oxygen and liquid must pass into the diffusion chamber. This helps to break-up the oxygen into small bubbles within the liquid so that they are more easily dissolved into the liquid in the diffusion chamber and downstream in the apparatus, e.g. in the venturi.

In one embodiment the apparatus comprises a mixing chamber in fluid communication with, and downstream of, the oxygen inlet and the liquid inlet (and also the diffusion chamber in the embodiment in which it is provided), the mixing chamber being arranged to induce turbulence into the fluid flowing therethrough. The mixing chamber produces turbulent flow of the liquid and the oxygen flowing through the mixing chamber which acts to break-up the oxygen into small bubbles within the liquid, e.g. smaller than they were broken up into in the diffusion chamber, so that they are more easily dissolved into the liquid in the mixing chamber and downstream in the apparatus, e.g. in the venturi. The mixing chamber may be provided in any suitable and desired way, i.e. to induce the necessary turbulent flow. Preferably the mixing chamber comprises one or more obstacles and/or a tortuous path. The obstacles may comprise one or more barriers in the flow path through the mixing chamber, around which the fluid flowing therethrough must pass.

As with the liquid inlet, the oxygen inlet, the conduit, the venturi and the outlet, preferably at least part of the mixing chamber and/or at least part of the diffusion chamber is formed in the integrally formed piece of material. Providing these components of the apparatus in the same integrally formed piece of material further increases the compact nature of the apparatus that does not contain multiple individually manufactured components, e.g. which need to be connected together with tubes.

The conduit (between the liquid and the oxygen inlets and the venturi), as well as any other conduits or flow paths between the various different components in the apparatus may take any suitable and desired configuration. In a preferred embodiment any bends in the conduit(s) and/or flow paths are preferably rounded. This has been found to aid the flow of fluid through the apparatus and reduces the shear and stress on the fluid, which is particularly important in the embodiment used for oxygenating a cell culture medium containing cells because this reduces the disturbance and destruction of the cells.

The arrangement of the various components of the apparatus (e.g. the liquid inlet, the oxygen inlet, the venturi, the outlet, the diffusion chamber and the mixing chamber) in the integrally formed piece of material, i.e. with at least part of each of the components being formed in the integrally formed piece of material, can be provided in any suitable and desired way. In one embodiment one or more of the components are formed in the integrally formed piece of material as an open channel in the face of the integrally formed piece of material, wherein the apparatus comprises a blank face of material, such that when the face of the integrally formed piece of material and the blank face of material are placed together in good contact the open channel in the integrally formed piece of material and the blank face of material form the one or more of the components.

In another embodiment one or more of the components are partly formed as an open channel in the face of the (a first) piece of material and with the remaining part of one or more of the components formed in the corresponding face of a second piece of material such that when the first piece of material and the second piece of material are placed together in good contact, their corresponding open channels form the components. Thus preferably the channel formed in the face of the second piece of material is a mirror image of the channel formed in the face of the first piece of material. However the open channel in the first piece of material and the open channel in the second channel may have different depths, for example. Furthermore, one or more of the liquid inlet, the oxygen inlet and the outlet may be formed in the opposite face of the first or second piece of material to the face in which the open channel is formed. This may be more convenient for attaching the liquid and/or oxygen supply to their respective inlets and/or for conveying the oxygenated liquid from the outlet to a secondary device, e.g. a bioreactor, for the oxygenated liquid to be used.

In the embodiments in which the apparatus comprises first and second integrally formed pieces of material, the first and second pieces of material can be attached to each other in any suitable and desired way in order to fully form the various components of the apparatus, e.g. by creating a fluid-tight seal between the first and second pieces of material such that the liquid and oxygen do not escape but flow through the various components of the apparatus. Various arrangements of attachment are contemplated by the Applicant which include using one or more clamps, screws, welding or gluing, etc. Preferably, the apparatus comprises a plurality of bolts which pass through and hold together the first and second integrally formed pieces of material.

In yet another embodiment one or more of the components are fully formed as a channel through a single piece of material. This allows all the main components of the apparatus to be provided in a single piece of material, enabling it to be provided in a compact and robust manner.

The above described embodiments for the different arrangements of a channel through the piece of material to form the different components are not mutually exclusive. Thus a combination of any or all of the embodiments is also envisaged. For example, one or more of the components may be formed by an open channel in the first piece of material and a blank face in the second piece of material, one or more of the other components may be formed by an open channel in the second piece of material and a blank face in the first piece of material, one or more of the other components may be formed by an open channel in the first piece of material and a corresponding open channel in the second piece of material and/or one or more of the other components may be fully formed as a channel through the first or second piece of material.

In one embodiment the single piece of material and/or the first and second pieces of material together (in the embodiments in which they are provided) forms a block of material, e.g. having a substantially cuboid shape. This configuration makes it particularly easy to form the components in the block of material, e.g. by milling the components (e.g. formed as a channel) in the block of material. However the Applicant envisages that the piece(s) of material may take other shapes as is suitable and desired. In one embodiment the piece(s) of material has a substantially cylindrical shape, e.g. pipe shaped, so that the piece(s) of material can be integrated easily into a pipe system.

The (first and/or second) integrally formed piece of material may have any suitable and desired dimensions. In one embodiment the integrally formed piece of material (e.g. the first or second, or the combination of both) has a width dimension of less than 30 cm, e.g. less than 25 cm, e.g. less than 20 cm, e.g. approximately 15 cm, and/or a height dimension of less than 30 cm, e.g. less than 25 cm, e.g. less than 20 cm, e.g. approximately 15 cm, and/or a depth dimension of less than 15 cm, e.g. less than 10 cm, e.g. approximately 7 cm. In these embodiments it will therefore be appreciated that the apparatus is easily portable and can conveniently be connected into an inline system for supplying oxygenated liquid to a downstream consuming device, e.g. a bioreactor or fermentor.

The piece(s) of material may comprise any suitable and desired material. In one embodiment the piece(s) of material comprises stainless steel, e.g. an integrally formed piece of stainless steel. Stainless steel allows the various components of the apparatus to be formed in the piece(s) of material and it is a relatively inert material such that very little corrosion of the material will occur during operation (and thus almost no contamination of the liquid flowing therethrough will occur). In another embodiment the piece(s) of material comprises diamond. Owing to the hardness of diamond, although it requires specialist machinery to form the various components of the apparatus, once formed the piece of material will be exceptionally durable and will result in no contamination of the liquid flowing therethrough. In one embodiment the piece(s) of material are suitable to be placed into an autoclave for sterilisation for subsequent use in the apparatus, e.g. as stainless steel and diamond are.

In yet a further embodiment the piece(s) of material comprises a polymer, e.g. a thermoplastic polymer. A polymer allows the various components, e.g. as a channel through the piece of material, to be formed by moulding the polymer into an appropriate shape. Preferably the polymer comprises a polymer which is able to be sterilised, either as part of its manufacture, e.g. during moulding, or afterwards prior to use by applying a suitable treatment. A further advantage of using a polymer for the piece of material is that the device may be manufactured relatively inexpensively and thus it is suitable for providing a device which is disposable and designed for single use.

The above described embodiments for the type of material the piece(s) of material may comprise are not mutually exclusive. In one embodiment, the first and second pieces of material (where provided) comprise different types of material. For example, in the embodiment in which the various components are formed as an open channel in the first piece of material, this could comprise stainless steel, which is conveniently milled to form the various components, while the second piece of material forming the blank face of material could comprise a polymer, e.g. polytetrafluoroethylene (PTFE), which can create a good seal with the stainless steel to form the channel.

As has been alluded to above, the components of the apparatus may be formed in the piece(s) of material in any suitable and desired way, e.g. as is most suitable for the type of material being used. Therefore the various components could be cast or milled (e.g. if the piece(s) of material comprises stainless steel or a polymer), engraved (e.g. if the piece(s) of material comprises diamond), 3-D printed or moulded (e.g. if the piece(s) of material comprises polymer), etched, burned, etc. Any of these manufacturing methods may be suitable for forming apparatus in the embodiment in which it comprises first and second integrally formed pieces of material as well as in the embodiment in which the one or more of the components are fully formed as a channel through a single piece of material. Conveniently, manufacture using computer aided design (CAD) may be used, e.g. a CAD milling machine.

The apparatus may be used at any temperature as is desired and is suitable, e.g. the ambient temperature of the liquid being supplied into the apparatus. Thus, for example, the apparatus could be operated at between approximately 10 degrees Celsius and approximately 12 degrees Celsius, e.g. for hydroponics at high altitude where this is the ambient temperature. However in a preferred embodiment the apparatus is operated at a temperature of between approximately 20 degrees Celsius and approximately 45 degrees Celsius, e.g. between approximately 25 degrees Celsius and approximately 45 degrees Celsius, which is suitable for cell cultures and media as well as the production of oxygenated liquids for medical applications. Preferably the apparatus is operated between approximately 35 degrees Celsius and approximately 37 degrees Celsius. This is the ideal temperature for supplying the oxygenated liquid to a bioreactor.

Therefore in a preferred embodiment the apparatus comprises a heater arranged to heat the liquid and/or the oxygen (as generally the ambient temperature of the liquid will be below the desired operating temperature of the apparatus). The heater may be arranged upstream of the integrally formed piece of material, e.g. arranged to heat the liquid being supplied to the liquid inlet and/or the oxygen being supplied to the oxygen inlet. In this embodiment the liquid and/or the oxygen are supplied at the desired temperature to their respective inlets.

In another embodiment the heater is arranged to heat the integrally formed piece of material, i.e. the liquid and/or the oxygen are supplied at a lower temperature to their respective inlets of the apparatus and when the liquid and/or the oxygen are inside the apparatus they are heated to the desired operating temperature. Thus preferably the heater is arranged in good thermal contact with one or more of: the liquid inlet, the oxygen inlet, the conduit, the venturi and the outlet, and the diffusion chamber and the mixing chamber where provided.

In the embodiment in which the heater is arranged to heat the integrally formed piece of material, the heater could be arranged in any suitable and desired way with respect to the integrally formed piece of material. Preferably the heater comprises a heating element, e.g. a thick film or sheathed heating element, in good thermal contact with the integrally formed piece of material, e.g. the heating element may be embedded in the integrally formed piece of material. This arrangement of the heater allows the liquid and/or the oxygen, e.g. the liquid-oxygen mixture, to be heated as it flows through the main body of the apparatus.

In a further embodiment the heater is arranged downstream of the integrally formed piece of material, e.g. arranged to heat the oxygenated liquid output from the outlet of the apparatus, before the liquid is supplied for its end use, e.g. into a bioreactor.

Embodiments are envisaged in which the apparatus may comprise more than one heater, e.g. two or more of: upstream of the integrally formed piece of material, arranged to heat the integrally formed piece of material and downstream of the integrally formed piece of material. Such arrangements may be desirable if, for example, the liquid is desired to be oxygenated at one temperature and then supplied to a further device, e.g. a bioreactor, at a different temperature. Thus further embodiments also exist in which the apparatus comprises a chiller arranged to cool the liquid and/or oxygen, e.g. downstream of the integrally formed piece of material.

In one embodiment the apparatus is arranged to produce oxygenated liquid with a concentration of dissolved oxygen of greater than 20 mg/l, e.g. greater than 40 mg/l, e.g. greater than 50 mg/l, e.g. greater than 60 mg/l, e.g. approximately 70 mg/l. Preferably these concentrations of dissolved oxygen are achieved when the apparatus is operated at a temperature of greater than 25 degrees Celsius, e.g. greater than 30 degrees Celsius, e.g. greater than 35 degrees Celsius, e.g. at approximately 37 degrees Celsius. Thus it will be appreciated that the Applicant has developed an apparatus, at least in preferred embodiments of the present invention, which achieves much higher concentrations of dissolved oxygen in the oxygenated liquid than in conventional arrangements.

As will also be appreciated, the concentration of dissolved oxygen able to be achieved depends on the temperature of the liquid flowing through the apparatus, with the achievable concentration generally increasing with decreasing temperature. Thus, while the Applicants have found that they have been able to achieve concentrations of dissolved oxygen as high as 60 mg/l at 37 degrees Celsius, for example, the concentration of dissolved oxygen achieved at 25 degrees Celsius may be higher, e.g. 70 mg/l.

After passing through the apparatus and being oxygenated, some of the oxygenated liquid may be recycled, e.g. the apparatus may comprise a conduit arranged to recycle a portion of the oxygenated fluid from the outlet to the liquid inlet, with the outlet being arranged to dispense a remaining portion of the oxygenated fluid that is not recycled, e.g. to a bioreactor. Thus in one embodiment the conduit has one end in fluid communication with, and downstream of, the outlet, and another end in fluid communication with and upstream of the liquid inlet. Recycling some of the oxygenated liquid may help to increase the concentration of dissolved oxygen in the liquid owing to at least some of the liquid passing multiple times through the apparatus before being dispensed. Preferably at least part of the recycling conduit is formed in the integrally formed piece of material.

However in a preferred embodiment the apparatus is arranged to operate in a single pass production mode, i.e. with no recycling of the oxygenated liquid. In this embodiment the apparatus takes the liquid from the liquid inlet, passes it through the apparatus where it is oxygenated, and outputs it from the apparatus through the outlet, e.g. to a downstream device, such that the apparatus can simply be connected in between a liquid supply and a device which uses the oxygenated liquid, e.g. a bioreactor. This helps to simplify the apparatus and its connections. In this embodiment, however, the oxygenated fluid may be recycled back to the apparatus after passing through the downstream consuming device, e.g. the bioreactor. Thus the apparatus may comprise a conduit arranged to recycle the oxygenated fluid from a downstream consuming device, e.g. the bioreactor, to the liquid inlet of the apparatus.

In one embodiment the apparatus comprises a gas/liquid separator downstream of and in fluid communication with the outlet, wherein the gas/liquid separator is arranged to separate undissolved oxygen (or other gases) from the (de-)oxygenated liquid. This allows bubbles of oxygen (or other gases) to be removed from the oxygenated liquid, e.g. in circumstances when they are not desired or where large amounts of undissolved gas is present. For example, in a bioreactor, bubbles may be detrimental to the production of cell cultures, or if the oxygenated liquid is being used intravenously it will be dangerous for bubbles of oxygen to be present. However there may be circumstances in which bubbles of oxygen in the oxygenated liquid can be tolerated or even preferred, e.g. to encourage the release of carbon dioxide in a bioreactor, and thus a gas/liquid separator may not be necessary.

In the embodiments comprising a gas/liquid separator, preferably the apparatus also comprises a gas recycling conduit for recycling undissolved gas (e.g. oxygen) back to the gas inlet. This helps to minimise the waste of undissolved gas and thus reduces the cost of the gas used in the process.

In addition to or instead of a gas/liquid separator, the apparatus may comprise a filter to remove additives or other unwanted substances from the liquid, either upstream of the liquid inlet or downstream of the outlet, i.e. before or after oxygenation of the liquid, or even within the main body of the apparatus, i.e. the integrally formed piece of material. For example, in one embodiment the apparatus comprises means to remove carbon dioxide from the liquid, e.g. a carbon dioxide scrubber, a carbon dioxide stripper, etc. As for the filter, the carbon dioxide removal means can be positioned in any suitable and desired place within the apparatus, e.g. upstream of the liquid inlet, downstream of the outlet or within the main body of the apparatus. Removal of carbon dioxide from the liquid may be desired, for example, when the oxygenated liquid is being fed to a bioreactor, with the carbon dioxide which is produced by the cells in the bioreactor needing to be removed before the liquid is recycled, for example, back to the bioreactor via the apparatus for (re-)oxygenation.

In another embodiment the apparatus comprises an additive inlet, either upstream of the liquid inlet or downstream of the outlet, arranged to supply one or more additives into the liquid. The use of a filter and/or an additive supply may depend on the use of the oxygenated liquid. For example nutrients may be added to the liquid before supplying the oxygenated liquid to a bioreactor, so that the cells being cultured in the bioreactor are suitably nourished, or nutrients or other additives may be added to the liquid before supplying the oxygenated liquid intravenously. Alternatively, or in addition, to having an additive inlet, the liquid supplied to the apparatus may already contain the desired additives, e.g. added during the preparation of the liquid.

The liquid may be flowed through the apparatus in any suitable and desired way. For example, the pressure of the incoming liquid owing to gravity, e.g. an elevated tank of liquid compared to the apparatus, could be employed to drive the liquid through the apparatus. This may be convenient when the apparatus is being used to deliver oxygenated liquid for intravenous use, for example. However in a preferred embodiment the apparatus comprises a liquid inlet pump in fluid communication with and upstream of the liquid inlet, wherein the liquid inlet pump is arranged to pump the liquid through the apparatus. Preferably the liquid inlet pump is external to the integrally formed piece of material and therefore can be provided as a separate, e.g., off-the-shelf, component.

The liquid inlet pump may comprise any suitable and desired type of pump, e.g. a magnetic drive pump (e.g. such as the PuraLev® series magnetic drive pump commercially available from Levitronix GmbH (Zurich, Switzerland)), or a positive displacement pump (e.g. a roller ball pump or a peristaltic pump). However, in a preferred embodiment the liquid inlet pump comprises a gear pump, e.g. an external gear pump, such as the GJR™ series of external gear pumps commercially available from Micropump, Inc. (Vancouver, Wash., USA). The Applicants have found that a gear pump is able to deliver a smooth, e.g. laminar, flow of liquid to the liquid inlet, which helps to maximise the oxygenation of the liquid.

The oxygen may be supplied into the apparatus in any suitable and desired way. The oxygen may be supplied into the apparatus in a liquid and/or a gaseous form. In one embodiment the apparatus comprises a pressurised oxygen supply, e.g. a pressurised gas cylinder containing oxygen, in fluid communication with the oxygen inlet.

The Applicants have appreciated that the gas may comprise any suitable and desired type of gas, e.g. nitrogen, argon, chlorine or carbon dioxide (as well as oxygen as outlined above), and thus when viewed from a further aspect the invention provides an apparatus for dissolving a gas into a liquid comprising:

a liquid inlet for supplying liquid into the apparatus;

a gas inlet for supplying gas into the liquid within the apparatus, the gas inlet being in fluid communication with, and downstream of, the liquid inlet;

a venturi in fluid communication with, and downstream of, the liquid inlet and the gas inlet, wherein the venturi is arranged to dissolve the gas into the liquid passing through the venturi; and an outlet for the liquid and dissolved gas in fluid communication with, and downstream of, the venturi;

wherein at least part of the liquid inlet, at least part of the gas inlet, at least part of the venturi and at least part of the outlet are formed in an integrally formed piece of material.

As will be appreciated by those skilled in the art, this aspect of the present invention can and preferably does include any one or more or all of the preferred and optional features of the invention described herein, as appropriate. For example, preferably the apparatus comprises a gas source in fluid communication with the gas inlet. Furthermore, specific references herein to components relating to oxygen are also applicable to any suitable and desired gas that may be used with the apparatus.

In one set of embodiments the apparatus comprises a plurality of gas (e.g. oxygen) inlets. Each gas inlet may be connected to the same gas source or to separate gas sources, the latter of which may supply the same or different types of gas to the multiple gas inlets. A plurality of gas inlets may be provided in an apparatus having a single venturi, e.g. in order to introduce a plurality of different gases into the liquid flow. Alternatively an apparatus comprising a plurality of gas inlets may comprise a plurality of venturis. Two or more, but preferably all, of the venturis may have a gas inlet arranged upstream of the respective venturi to introduce the gas from the respective gas inlet (and gas source) into the liquid flow. This arrangement allows different gases (or different amounts of the same gas) to be introduced into the liquid flow upstream of each of the venturis when, e.g., a mix of different gases is desired to be dissolved into or displaced from the liquid.

A further embodiment in which a plurality of gas inlets is provided is in a system comprising a plurality of apparatuses, e.g. arranged in series or parallel, as described below. In such a system, each apparatus may have one or a plurality of gas inlets.

Similarly, in one set of embodiments the apparatus comprises a plurality of liquid inlets. As with the set of embodiments comprising a plurality of gas inlets, the plurality of liquid inlets may be connected to the same liquid source or to separate liquid sources, the latter of which may supply the same or different types of liquids to the multiple liquid inlets. A plurality of liquid inlets may be provided in an apparatus having a single venturi, e.g. in order to dissolve gas into a plurality of different liquids. Alternatively an apparatus comprising a plurality of liquid inlets may comprise a plurality of venturis. Two or more, but preferably all, of the venturis may have a liquid inlet arranged upstream of the respective venturi to introduce the liquid from the respective liquid inlet (and liquid source) into the apparatus. This arrangement allows different to be introduced into the apparatus upstream of each of the venturis when, e.g., a mix of different liquids is desired to have gas dissolved into or displaced from the liquid.

A further embodiment in which a plurality of liquid inlets is provided is in a system comprising a plurality of apparatuses, e.g. arranged in series or parallel, as described below. In such a system, each apparatus may have one or a plurality of liquid inlets.

Furthermore, the apparatus may comprise a plurality of gas inlets and a plurality of liquid inlets, e.g. if a mix of different gases is desired to be dissolved into or displaced from a plurality of different liquids.

In a preferred embodiment the gas (other than oxygen) comprises nitrogen. Nitrogen has a number of advantages, particularly that it can be used to deplete the liquid of oxygen, by displacing oxygen from the liquid, but also that it is abundant, cheap and easy to work with. Nitrogen (or gases other than oxygen) can therefore be used to control the oxygen concentration in a liquid, e.g. to provide a liquid (e.g. a cell medium to a bioreactor) with a low oxygen concentration.

In another embodiment the gas comprises a flammable gas, e.g. for use in biorefining.

In a number of uses of such liquid when a low oxygen concentration is required, e.g. in some bioreactors, if the liquid is in fluid communication with ambient air then the oxygen concentration will increase, drifting towards equilibrium with the ambient air, necessitating regular de-oxygenation of the liquid to maintain its oxygen concentration at the desired level. For example, stem cells are better grown in a medium having a low oxygen concentration during one phase of culturing the cells.

The flow rate of the liquid through the apparatus may be any suitable and desired value or range of values, e.g. depending on the end use of the oxygenated liquid. In one embodiment the apparatus is arranged to deliver a flow rate of oxygenated liquid of between 0.01 ml/min and 100 l/min from the outlet of the apparatus, e.g. between 0.1 ml/min and 50 l/min, e.g. between 1 ml/min and 20 l/min, e.g. between 5 ml/min and 5 l/min. Therefore preferably the liquid inlet pump is arranged to deliver a flow rate of between 0.01 ml/min and 100 l/min, e.g. between 0.1 ml/min and 50 l/min, e.g. between 1 ml/min and 20 l/min, e.g. between 5 ml/min and 5 l/min. In practice the flow rate will be selected to be appropriate for the end use of the oxygenated liquid and thus the liquid inlet pump may not need to be capable of delivering the full range of flow rates. For example, a flow rate of 0.01 ml/min may be required for intravenous use of the oxygenated liquid, e.g. where this is supplied directly to a patient, whereas a flow rate of 50 l/min may be required for use of the oxygenated liquid in a bioreactor.

The pressure of the liquid flowing through the apparatus may be any suitable and desired value or range of values. In one embodiment the apparatus is arranged to operate at a fluid pressure of between 0.1 and 5 bar, e.g. between 0.5 and 4 bar, e.g. approximately 3 Bar. Thus preferably the liquid inlet pump is arranged to deliver a pressure of between 0.1 and 5 bar, e.g. between 0.5 and 4 bar, e.g. approximately 3 Bar.

The term "liquid" is to be taken to mean liquids in the conventional sense as well as gels which are flowable, i.e. that behave as liquids. The apparatus is arranged to be used with any such liquids as is suitable and desired, e.g. for the particular use of the oxygenated liquid. A non-limiting list of liquids that could be used with the apparatus include: water, (whole) blood or any component of blood (e.g. plasma), cell suspensions, cell media, phosphate buffered saline (e.g. an isotonic solution), physiological solutions, flowable gels, contact lens solutions, anti-septic liquids, buffers and milk.

Use of the apparatus in the oxygenation of liquids for use in culturing cells represents a preferred embodiment. Liquids suitable for use as cell culture media may include one or more of the following components: minerals, carbon sources (such as saccharides (e.g. mono, di, oligo and polysaccharides, especially mono and disaccharides)), nitrogen sources (e.g. nitrates, proteins or protein fragments, ammonium compounds, oligopeptides, amino acids (especially essential amino acids, e.g. tryptophan and/or glutamine)), nucleic acids and nucleic acid fragments, lipids, etc. Particularly preferably the liquid contains glucose and added nitrate and mineral salts (e.g. potassium, calcium, magnesium, sodium, molybdenum, iron, zinc, boron, cobalt, manganese and nickel compounds), especially glucose. Preferably the liquid contains one or more vitamins, e.g. folic acid, nicotinamide, riboflavin, $B_{12}$. The liquid may contain fetal bovine serum (FBS) but preferably the liquid contains one or more non-ionic triblock copolymers, e.g. poloxamers, which help to promote cell survival, growth, production, etc.

The concentrations of the various components of the liquid may be any suitable and desired concentrations, e.g. to suit the application for which the liquid is being used. The concentration of poloxamer in the liquid is preferably between 1% and 20% of the total volume, e.g. between 2% and 15%, e.g. 4% or 14%. The concentration of poloxamer in the liquid may depend on the type of the cell culture medium being used.

The cell culture medium may comprise any suitable and desired cell culture medium, for example Eagle's minimal essential medium (EMEM). In a preferred embodiment the cell culture medium comprises Dulbecco's modified Eagle's medium (DMEM), e.g. containing 4% poloxamer.

The cells used may comprise any suitable and desired cells, e.g. any living organism for culture in the downstream consuming device, e.g. a bioreactor or fermentor. Preferably the cells in the cell suspension or for use with the cell media comprise one or more of insect cells, anaerobic and/or aerobic bacteria, *Escherichia coli* (*E. coli*), fungi (e.g. yeast) and animal cells, e.g. mammalian cells.

In one embodiment the apparatus comprises a pressure sensor arranged to measure the pressure of the liquid in the apparatus, and/or an oxygen sensor arranged to measure the concentration of dissolved oxygen in the liquid, and/or a flow rate sensor, e.g. a flow meter, arranged to measure the flow rate of the liquid through the apparatus, and/or a temperature sensor arranged to measure the temperature of the liquid in the apparatus.

The various sensors may be positioned to measure their respective variables at any suitable point in the apparatus. For example, the pressure sensor is preferably positioned between the liquid inlet and the venturi, e.g. downstream of the mixing chamber in the embodiments in which this is provided. Preferably the oxygen sensor is positioned downstream of the venturi. Preferably the temperature sensor is positioned downstream of the heater, in the embodiments which comprise a heater.

Providing one or more, preferably all, of these sensors allows the respective variables to be measured. This enables feedback to be performed in order to optimise the performance of the apparatus and/or provides quality control. Thus preferably, in the embodiments in which they are provided, the temperature sensor is arranged to provide feedback to the heater (e.g. such that the heater can be operated, based on the feedback, to control the temperature of the liquid in the apparatus, e.g. to maintain it at a particular temperature), and/or the flow rate sensor is arranged to provide feedback to the liquid inlet pump (e.g. such that the pump can be operated, based on the feedback, to control the flow rate of the liquid through the apparatus, e.g. to maintain it at a particular flow rate), and/or the oxygen sensor is arranged to provide feedback to one or more of: the oxygen supply, the liquid inlet pump and the heater (e.g. such that one or more of the gas, e.g. oxygen, supply, the liquid inlet pump and the heater can be operated, based on the feedback, to control their operation, e.g. to maintain the gas, e.g. oxygen, concentration of the liquid at a particular gas, e.g. oxygen, concentration).

Preferably the apparatus comprises a control arranged to receive the measurements output from one or more (and preferably all) of the sensors and to send control signals to the respective components with which the sensors are arranged to provide feedback to. Thus, for example, the measurements from the flow rate sensor are received by the control which then sends an appropriate control signal to the liquid inlet pump, e.g. by changing the input voltage to the pump, or to the plurality of valves, e.g. such that the flow rate of the liquid through the apparatus can be controlled, e.g. to maintain it at a particular flow rate. This feedback and control provides regulation of the various different variables within the apparatus.

Furthermore, the cross sectional area of the flow path through the apparatus may be chosen, e.g. during manufacture of the apparatus, to control the flow rate of the liquid through the apparatus. This may be relevant for applications of the apparatus for intravenous use, for example, in which gravity is used to drive the liquid through the apparatus. In these embodiments the apparatus may comprise a flow rate sensor, e.g. a flow meter, to provide feedback, e.g. to a control, of the flow rate of the liquid passing through the apparatus.

The apparatus may be used to supply, e.g. oxygenated, liquid for any suitable and desired use. As mentioned above, one particularly preferred use is to supply the, e.g. oxygenated, liquid to a bioreactor. Another use is to supply the, e.g. oxygenated, liquid for intravenous use, e.g. for a therapeutic use. In one embodiment the apparatus is arranged to operate continuously, e.g. to continuously supply, e.g. oxygenated, liquid to flow through a bioreactor or through an intravenous cannula. Thus preferably the apparatus comprises a conduit in fluid communication with, and downstream of, the outlet, the conduit being arranged to supply the output, e.g. oxygenated, liquid to an external device, e.g. a bioreactor.

Thus the invention extends to a system comprising an apparatus according to the any of the aspects described herein and any or all of the embodiments thereof, and a downstream consuming device, e.g. a bioreactor, wherein the outlet of the apparatus is in fluid communication with the downstream consuming device such that, e.g. oxygenated, liquid can be supplied to the downstream consuming device.

Although preferably the downstream consuming device comprises a bioreactor, the downstream consuming device to which the liquid is output may comprise any suitable and desired device. For example, the downstream consuming device may comprise a fermentor, a high-performance liquid chromatography (HPLC) device or a device to stabilise one or more components of a fluid, e.g. using an oxygenated or de-oxygenated liquid.

Such a system supplying, e.g. oxygenated, liquid for a downstream consuming use may comprise a single apparatus. However the Applicant has envisaged that a plurality of such apparatuses may, for example, be arranged in series and/or parallel, with the, e.g. oxygenated, liquid output from the plurality of apparatuses being supplied to the downstream consuming device. Such an arrangement may increase the flow rate capacity of the system, i.e. increase the flow rate of liquid having gas dissolved therein, e.g. being oxygenated, and thus the flow rate of, e.g. oxygenated, liquid being supplied from the apparatus.

In a preferred embodiment the apparatus and/or system comprises a holding volume for the, e.g. oxygenated, liquid, wherein the holding volume is in fluid communication with and downstream of the outlet, and preferably also in fluid communication with and upstream of the liquid inlet, of the apparatus, e.g. via appropriate conduits. This is considered to be novel and inventive in its own right and thus when viewed from a further aspect the invention provides a system for supplying a liquid to a downstream consuming device comprising:

an apparatus for dissolving a gas into a liquid comprising:
a liquid inlet for supplying liquid into the apparatus;
a gas inlet for supplying gas into the liquid within the apparatus, the gas inlet being in fluid communication with, and downstream of, the liquid inlet;
a venturi in fluid communication with, and downstream of, the liquid inlet and the gas inlet, wherein the venturi is arranged to dissolve the gas into the liquid passing through the venturi; and
an outlet for the liquid and dissolved gas in fluid communication with, and downstream of, the venturi; and
a holding volume in fluid communication with and downstream of the outlet of the apparatus.

As will be appreciated by those skilled in the art, this aspect of the present invention can and preferably does include any one or more or all of the preferred and optional features of the invention described herein, as appropriate. For example, preferably at least part of the liquid inlet, at least part of the gas inlet, at least part of the venturi and at least part of the outlet are formed in an integrally formed piece of material. Also, preferably the gas comprises oxygen and the gas inlet comprises an oxygen inlet for supplying oxygen into the liquid within the apparatus.

Providing a holding volume for the, e.g. oxygenated, liquid allows the apparatus or system to maintain a certain amount of, e.g. oxygenated, liquid that is available for supplying to a downstream consuming device, for example, so that liquid can be provided whenever it is required, e.g. on demand, without having to be constrained by the flow rate of the liquid through the venturi, for example. The oxygen concentration of the liquid in the holding volume (or concentration of other gas therein) is therefore preferably maintained at a suitable and desired level, e.g. for supplying to a downstream consuming device, where provided as part of a system.

The holding volume may have any suitable and desired volume. In a preferred embodiment the holding volume has an internal volume between 500 ml and 20 l, e.g. between 1 l and 10 l, e.g. between 2 l and 5 l. When supplying the liquid to a downstream consuming device, the size of the holding volume may depend on the size of the downstream consuming volume. Preferably the size of the holding volume is proportional to the size of the downstream consuming volume.

Preferably the holding volume is also in fluid communication with an inlet, and preferably also an outlet, of the downstream consuming device, where provided as part of a system, e.g. via appropriate conduits. This allows the, e.g. oxygenated, liquid to be provided to the downstream consuming device and also recycled, when necessary, e.g. on demand. Such connections may therefore be provided instead of (but could also be provided as well as) the direct connections described above between the apparatus and the downstream consuming device, e.g. the outlet from the oxygenating part of the apparatus and the downstream consuming device may be connected via the holding volume.

The holding volume may contain a self-sufficient volume of liquid for the requirements of the apparatus, e.g. the holding volume may comprise the liquid source for supplying to the liquid inlet, but preferably the holding volume comprises a liquid inlet for supplying liquid into the holding volume, e.g. which is in fluid communication with a liquid source, e.g. a feeder tank. As described above the apparatus and/or system may comprise a plurality of liquid sources, each in fluid communication with the liquid inlet (or a plurality of liquid inlets) of the holding volume, to allow different types of liquid to be supplied to the holding volume.

The liquid source, e.g. the feeder tank, is preferably in fluid communication with (e.g. via one or more conduits) the downstream consuming device, e.g. to supply liquid to the downstream consuming device and/or to recycle liquid back to the liquid source. These connections may be direct between the liquid source and the downstream consuming device, though preferably they are via the holding volume.

As described above, the connections between the various components of the apparatus and/or system may be arranged such that the liquid is flowed through the apparatus and/or system in any suitable and desired way, e.g. using gravity to drive the liquid through the apparatus and/or system. However preferably the apparatus and/or system preferably comprises one or more pumps arranged to pump the liquid through the apparatus and/or system. The liquid inlet pump described above, in fluid communication with and upstream of the liquid inlet of the (oxygenating part of the) apparatus, which is arranged to pump the liquid through the apparatus, is preferably also in fluid communication with and downstream of the holding volume, and is arranged to pump liquid from the holding volume to the liquid inlet of the apparatus.

When the outlet of the apparatus is in fluid communication with the holding volume, preferably the liquid inlet pump between the holding volume and the liquid inlet of the apparatus is sufficient to pump the liquid through the apparatus and back to the holding volume, though a further pump may be provided, e.g. between the outlet of the apparatus and the holding volume if necessary.

When the holding volume is in fluid communication with the liquid source, preferably the apparatus and/or system comprises a liquid source pump in fluid communication with and downstream of the liquid source (and thus in fluid communication with and upstream of the holding volume) which is arranged to pump liquid from the liquid source to the holding volume.

When the holding volume is in fluid communication with the downstream consuming device, preferably the system comprises an outlet pump in fluid communication with and downstream of the holding volume (and thus in fluid communication with and upstream of the downstream consuming device) which is arranged to pump liquid from the holding volume to the downstream consuming device. When the downstream consuming device is arranged to recycle liquid back to the holding volume (or other part of the system), preferably the system comprises a recycling pump in fluid communication with and downstream of the downstream consuming device (and thus in fluid communication with and upstream of the holding volume) which is arranged to pump liquid from the downstream consuming device to the liquid source. When the downstream consuming device is arranged to recycle liquid via the liquid source back to the holding volume, this latter recycling pump may be the same as or as well as the liquid pump (as described above) between the liquid source and the holding volume.

The various pumps described may each comprise any suitable and desired type of pump, e.g. a magnetic drive pump, a positive displacement pump (e.g. a roller ball pump or a peristaltic pump) but, as described above, preferably one or more (and preferably all) of the pumps comprise a gear pump, e.g. an external gear pump.

The holding volume may comprise any suitable and desired container for the, e.g. oxygenated, liquid, with the necessary connections to the apparatus and the downstream consuming device, where provided. For example, the holding volume may comprise a flexible polymer bag (e.g. similar to those used for intravenous fluids), but preferably the holding volume comprises a rigid container, e.g. a glass or rigid polymer container. A rigid container is better suited for containing a build-up of pressure in the apparatus or system.

In a preferred embodiment the holding volume comprises a vent in fluid communication with the atmosphere outside of the holding volume. This helps the holding volume to control the atmosphere and the pressure inside the holding volume, e.g. as the holding volume may comprise a volume greater than that of the liquid therein and may thus also contain a volume of gas, e.g. air. The vent may comprise any suitable and desired type of vent. The vent may be active and thus able to actively control the pressure and composition of the atmosphere inside the holding volume, however preferably the vent is passive. Preferably the vent comprises a filter, e.g. comprising nylon and/or other polymers, for example in the form of a flat disc in a wall of the holding volume.

In a preferred embodiment the holding volume comprises an agitator for stirring the liquid in the holding volume. This maintains the homogeneity of the liquid and thus the oxygen (or other gas) concentration thereof, particularly if the liquid inlets to the holding volume, e.g. from the liquid source, the liquid outlet of the apparatus and the downstream consuming device, are supplying liquid into the holding volume at different positions, e.g. levels.

In a preferred embodiment the holding volume comprises an oxygen sensor arranged to measure the concentration of dissolved oxygen in the liquid in the holding volume, e.g. instead of or as well as the oxygen sensor in the apparatus described above. This enables the concentration of dissolved oxygen in the liquid within the holding volume to be controlled, e.g. by passing it through the apparatus to (re-)oxygenate the liquid, if the oxygen concentration in the liquid in the holding volume is detected to have fallen below a particular threshold, e.g. 50 mg/l.

In a preferred embodiment the downstream consuming device comprises an oxygen sensor arranged to measure the concentration of dissolved oxygen in the liquid in the downstream consuming device, e.g. instead of or as well as the oxygen sensor in the apparatus and/or holding volume described above. This enables the concentration of dissolved oxygen in the liquid within the downstream consuming device to be controlled, e.g. by having more liquid from the holding volume or apparatus supplied into the downstream consuming device, or increasing the rate of liquid being supplied from the holding volume or apparatus, if the oxygen concentration in the liquid in the downstream consuming device is detected to have fallen below a particular threshold.

When the system comprises oxygen sensors in both the holding volume and the downstream consuming device, preferably the oxygen sensor in the holding volume is independent of the oxygen sensor in the downstream consuming device and vice versa.

In a preferred embodiment the holding volume comprises a level sensor, e.g. a capacitive proximity liquid sensor, arranged to measure the level of the liquid in the holding volume. This enables the amount of, e.g. oxygenated, liquid to be controlled, e.g. by having more liquid from the liquid source supplied into the holding volume, so that there is sufficient liquid to be supplied to the downstream consuming device when required.

In a preferred embodiment the holding volume comprises a conductivity sensor, e.g. a continuity probe, to measure the conductivity of the liquid in the holding volume. This allows the concentration of electrolytes in the liquid to be measured, thus giving an indication of the amount of minerals and/or salts, for example, in the liquid in the holding volume. This then allows the concentration of electrolytes in the liquid in the holding volume to be controlled, e.g. by having more liquid from the liquid source supplied into the holding volume and/or adding the required electrolytes, e.g.

minerals and/or salts, if the conductivity of the liquid in the holding volume is detected to have fallen below a particular threshold.

The Applicants have observed that when some types of liquid, e.g. cell culture media (particularly when containing a poloxamer, e.g. above a certain concentration), are passed through the apparatus, in particular through the venturi, foam is produced, e.g. under certain operating conditions. One reason for this is owing to micro-bubbles being released into the liquid as the liquid passes through the apparatus and/or system, which may occur in certain operating conditions. The production of foam can be a problem if the liquid is to be supplied to a downstream consuming device, e.g. a bioreactor, as the foam may have a deleterious effect on the use of the, e.g. oxygenated, liquid. For example, when the liquid is supplied to a bioreactor, the presence of foam may disturb the cells or organisms present in the liquid, limiting the production, and in some cases leading to the death, of the cells or organisms being cultured.

In a preferred embodiment the apparatus and/or the system comprises means for reducing foam in the liquid. Providing foam reducing means helps to prevent the production of foam and/or reduce, e.g. disperse, the amount of foam when produced. The foam reducing means may comprise any suitable and desired arrangement and may be provided in any suitable and desired location within the apparatus and/or system. In a preferred embodiment the holding volume comprises the foam reducing means.

In a preferred embodiment the foam reducing means comprises an ultra-sonic emitter arranged to emit ultrasound waves, e.g. into the holding volume. Using an ultra-sonic emitter helps to disperse or prevent any foam that is produced, e.g. from the liquid passing through the apparatus, e.g. the venturi, and which thus may be present when the liquid is output to the holding volume or the downstream consuming device, for example. Preferably the frequency and/or amplitude at which the ultra-sonic emitter is arranged to emit the ultrasound waves can be controlled, so that the ultra-sonic emitter can be tuned to suit the conditions, e.g. the type and/or amount of foam present and/or being produced.

In another embodiment, instead of or as well as the ultra-sonic emitter, the foam reducing means comprises means for reducing or stopping the flow of liquid through the apparatus, e.g. by reducing the flow rate produced by one or more of the pumps or stopping the one or more of the pumps (e.g. the liquid inlet pump between the holding volume and the apparatus). The Applicants have observed that after reducing or stopping flow of the liquid through the apparatus, any foam that is present disperses.

In another embodiment, instead of or as well as the ultra-sonic emitter, the foam reducing means comprises means for reducing or stopping the flow of gas, e.g. oxygen, into the apparatus, e.g. by reducing or stopping the flow rate of gas through the gas inlet of the apparatus, e.g. by controlling a valve between the gas source and the gas inlet. The Applicants have observed that after reducing or stopping flow of the gas into the apparatus, any foam that is present disperses.

In another embodiment, instead of or as well as the ultra-sonic emitter and/or means for reducing or stopping the flow of liquid or gas, the foam reducing means comprises means for increasing the pressure of the liquid in the apparatus and/or system. Increasing pressure helps to reduce the foam being or that has been produced, e.g. by suppressing the production of micro-bubbles in the apparatus and/or system.

The pressure may be increased at any suitable and desired part of the apparatus and/or system and in any suitable and desired way. In one embodiment the (e.g. so-called "process") pressure is increased within the apparatus for dissolving gas into the liquid, e.g. by increasing the pressure applied by the liquid inlet pump which is arranged to pump the liquid through the apparatus, e.g. into the liquid inlet. The (e.g. process) pressure may also be increased by restricting or stopping the flow of liquid within the apparatus, e.g. using the one or more valves fluid communication with the venturis. The (e.g. process) pressure may also be increased by increasing the flow of gas, e.g. oxygen, through the gas inlet, e.g. by controlling a valve at the gas inlet.

In another embodiment the system comprises a valve downstream of the outlet of the apparatus, e.g. between the outlet of the apparatus and the holding volume, e.g. at the outlet of the apparatus, arranged to restrict or stop the flow of liquid therethrough. The valve can then be controlled, e.g. at least partially closed, to increase the (e.g. so-called "back-up") pressure within the apparatus. The valve may comprise any suitable or desired type of valve, e.g. a needle valve.

A further benefit of increasing the pressure within the apparatus, e.g. either or both of the process and back-up pressures (which the skilled person will appreciate are related to each other), is that the Applicants have found it to increase the resultant concentration of the gas, e.g. oxygen, which is dissolved into the liquid in the apparatus. The pressure of the liquid in the apparatus and/or system can therefore be tuned to optimise the uptake of gas into the liquid and to reduce the amount of foam being produced. Preferably the (e.g. back-up) pressure within the apparatus, e.g. created by the valve between the outlet of the apparatus and the holding volume (instead of or as well as the pressure generated by the liquid inlet pump into the apparatus), is greater than 0.5 bar, e.g. greater than 1 bar, e.g. greater than 1.5 bar, e.g. greater than 2 bar, e.g. greater than 2.5 bar.

Preferably the valve is arranged to operate such that the pressure of the output liquid downstream from the valve is at atmospheric pressure. Thus preferably the output liquid is supplied to the downstream consuming device, and the downstream consuming device is arranged to operate, such that there is no build-up of pressure, e.g. the downstream consuming device is arranged to operate at atmospheric pressure.

In another embodiment the pressure is increased within the holding volume, e.g. by controlling the vent in the holding volume. Thus the vent in the holding volume may be closed or restricted to increase the pressure within the holding volume to prevent or reduce any foam.

The Applicants have also observed that excess, e.g. undissolved, gas in the apparatus contributes to the production of foam. Therefore in a preferred embodiment the apparatus and/or system comprises means for venting excess gas from the apparatus and/or system. The venting means may comprise any suitable and desired arrangement, e.g. a pressure relief valve. The pressure relief valve may be positioned in any suitable and desired location in the apparatus and/or system, e.g. within the apparatus. In a preferred embodiment the venting means comprises a plenum chamber downstream of the outlet of the apparatus (and preferably also upstream of the holding volume), wherein the plenum chamber comprises a pressure relief valve for venting excess gas from the apparatus.

The pressure relief valve may comprise any suitable and desired type of valve, e.g. a mechanical valve (e.g. comprising a spring release) or electromechanical valve. The pressure relief valve may be actuated automatically, e.g. when a particular pressure is exceeded, or it may be controlled using the pressure in the apparatus measured by a pressure sensor, e.g. the pressure sensor described above which is arranged to measure the pressure of the liquid in the apparatus or by a separate pressure sensor which is arranged to measure the pressure of the excess gas in the apparatus.

In a preferred embodiment the holding volume comprises a foam sensor arranged to detect the presence of foam in the holding volume. This enables foam to be detected so that the foam can be reduced and/or prevented, e.g. by operating the foam reducing means. The liquid level sensor in the holding volume may be arranged to operate as a foam sensor, e.g. as well as a liquid level sensor, but preferably a separate foam sensor is provided. The foam sensor may comprise any suitable and desired sensor to detect the presence of foam. However, preferably the foam sensor comprises a level sensor, e.g. in addition to the liquid level sensor. The foam level sensor preferably comprises a capacitive proximity sensor which is arranged to detect the presence of foam in the holding volume.

Thus in a particularly preferred embodiment the holding volume comprises two level sensors, one arranged to measure the level of the liquid in the holding volume and another to detect the presence of foam in the holding volume, e.g. to detect the excess production of foam so that the vent (when provided) is not blocked. Preferably the two level sensors are arranged at different heights in the holding volume, e.g. the liquid level sensor above the foam level sensor. Preferably one or both of the level sensors are arranged to measure when liquid and foam respectively is present at the level they are positioned.

As described above in relation to the sensors which may be provided in the apparatus to measure various respective variables, the other sensors which are arranged in the apparatus and/or system may be positioned to measure their respective variables at any suitable point in the apparatus and/or system. Providing one or more, preferably all, of these sensors allows the respective variables to be measured. This enables feedback to be performed in order to optimise the performance of the apparatus and/or provides quality control.

When an oxygen sensor in the holding volume is provided, preferably the holding volume's oxygen sensor is arranged to provide feedback to the liquid inlet pump between the holding volume and the liquid inlet of the apparatus (e.g. such that the liquid inlet pump can be operated, based on the feedback, to pump more liquid through the apparatus to control the dissolved gas concentration in the liquid in the holding volume, e.g. at a particular value).

When an oxygen sensor in the downstream consuming device is provided, preferably the downstream consuming device's oxygen sensor is arranged to provide feedback to the outlet pump downstream of the holding volume and upstream of the downstream consuming device (e.g. such that the outlet pump can be operated, based on the feedback, to pump more liquid from the holding volume to the downstream consuming device, to control the dissolved gas concentration in the liquid in the downstream consuming device, e.g. to maintain it at a particular value).

When a level sensor is provided, preferably the level sensor, e.g. the liquid level sensor, is arranged to provide feedback to the liquid source pump between the liquid source and the holding volume (e.g. such that the liquid source pump can be operated, based on the feedback, to control the level of the liquid in the holding volume, e.g. to maintain it at a particular level).

When a conductivity sensor is provided, preferably the conductivity sensor is arranged to provide feedback to the liquid source pump between the liquid source and the holding volume (e.g. such that the liquid source pump can be operated, based on the feedback, to control the electrolyte concentration of the liquid in the holding volume, e.g. to maintain it at a particular value).

When a pressure sensor is provided, preferably the pressure sensor is arranged to provide feedback to the pressure relief valve (e.g. such that the pressure relief valve can be actuated, based on the feedback, to vent excess gas in the apparatus to control the pressure in the apparatus, e.g. to maintain it at a particular level).

When a foam sensor is provided, preferably the foam sensor is arranged to provide feedback to the foam reducing means (e.g. such that the foam reducing means can be operated, based on the feedback, to reduce the foam in the system). (When the foam reducing means comprises multiple components, e.g. an ultra-sonic emitter, means for reducing or stopping the flow of liquid through the apparatus, means for reducing or stopping the flow of gas into the apparatus, and/or means for increasing the pressure of the liquid in the apparatus and/or system, the foam sensor may be arranged to provide feedback to one or more of the ultra-sonic emitter, the means for reducing or stopping the flow of liquid through the apparatus, and/or the means for increasing the pressure of the liquid in the apparatus and/or system.)

Preferably the apparatus and/or system comprises a control arranged to receive the measurements output from one or more (and preferably all) of the sensors and to send control signals to the respective components with which the sensors are arranged to provide feedback to, e.g. the feedback is provided from the sensors to the respective components via the control. This may be a different, but preferably the same, control as described above with reference to the apparatus. Thus, for example, the measurements from the foam sensor are received by the control which then sends an appropriate control signal to the foam reducing means, e.g. by activating the ultra-sonic emitter. This feedback and control provides regulation of the various different variables within the apparatus.

Embodiments of the invention will now be described, by way of example only, with reference to the accompanying drawings, in which:

FIG. 4b shows a plan view of the oxygenation device shown in FIG. 4a;

Figure 1:
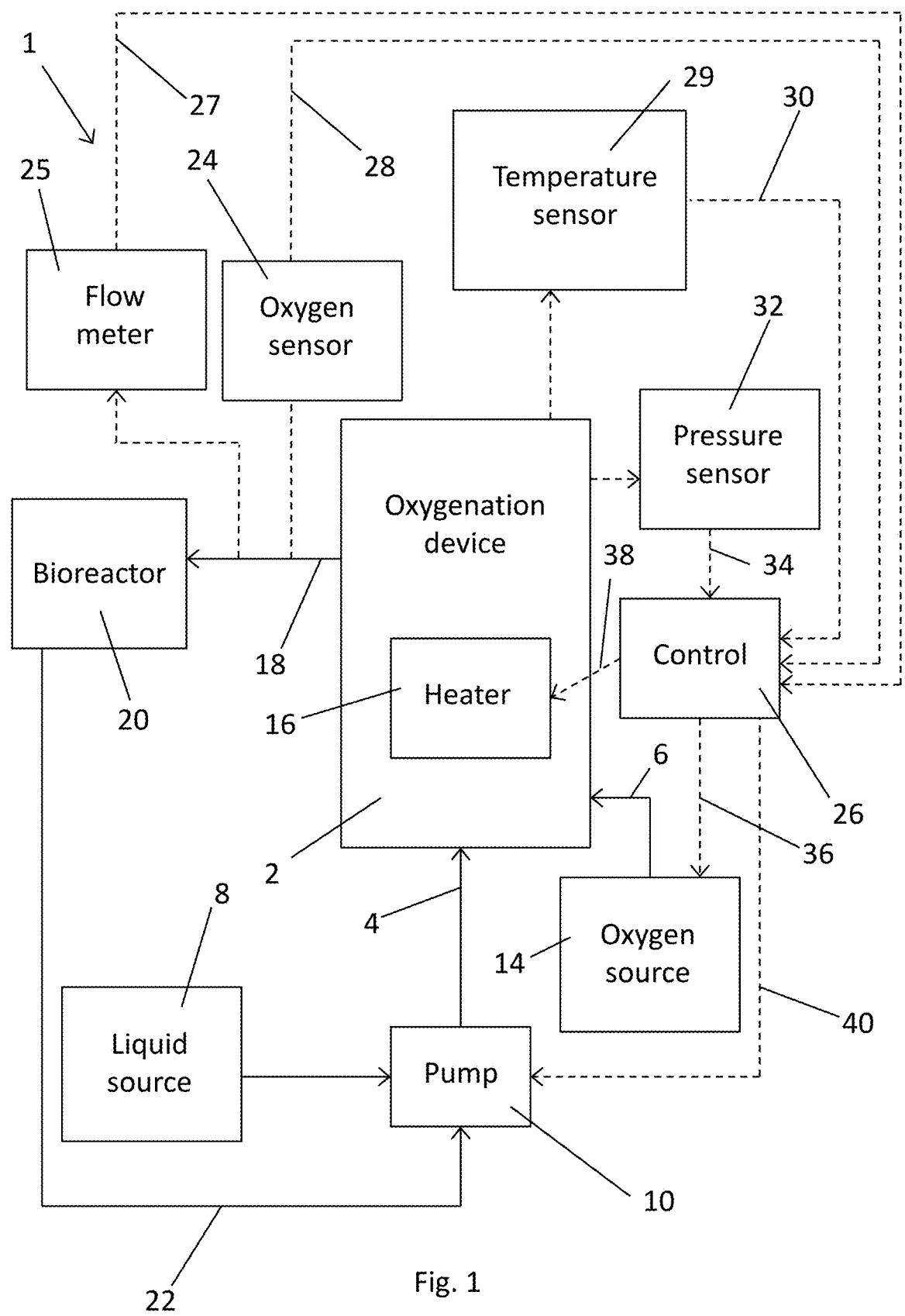
FIG. 1 shows a schematic diagram of a system including an apparatus according to an embodiment of the present invention which includes an oxygenation device.

FIG. 1 shows a schematic diagram of a system including an apparatus 1 according to an embodiment of the present invention. Solid lines indicate the flow of fluids, i.e. liquid or oxygen, through appropriate conduits, and dashed lines indicate the transfer of information, e.g. control signals. The apparatus 1 includes an oxygenation device 2 that has a liquid inlet 4 and an oxygen inlet 6. Liquid, e.g. cell culture media, is pumped into the liquid inlet 4 from a liquid source 8, e.g. a feeder tank, by a pump 10, e.g. a gear pump. Oxygen is supplied into the oxygen inlet 6 from an oxygen source 14, e.g. a pressurised gas canister of oxygen.

The oxygenation device 2 includes a heater 16 arranged to heat the liquid supplied to the oxygenation device 2 via the liquid inlet 4, and an outlet 18 for oxygenated liquid. The outlet 18 supplies the oxygenated liquid to a bioreactor 20. Oxygenated liquid which has been used by the bioreactor 20 is returned to the oxygenation device 2 via a recycling conduit 22 and the pump 10.

An oxygen sensor 24 is arranged to measure the concentration of dissolved oxygen in the oxygenated liquid output from the oxygenation device 2 through the outlet 18. The dissolved oxygen concentration measurements are sent to a control 26 via a wire 28. A flow meter 25 is arranged to measure the flow rate of the oxygenated liquid output from the oxygenation device 2 through the outlet 18. The flow rate measurements are sent to the control 26 via a wire 27. A temperature sensor 29 is arranged to measure the temperature of the liquid flowing through the oxygenation device 2, downstream of the heater 16. The temperature measurements are sent to the control 26 via a wire 30. A pressure sensor 32 is arranged to measure the pressure of the liquid flowing through the oxygenation device 2. The pressure measurements are sent to the control 26 via a wire 34.

The control is connected to the oxygen source 14, the heater 16 and the pump 10 by respective wires 36, 38, 40 and is arranged to communicate with these components using control signals sent along the wires 36, 38, 40.

Figure 2A:
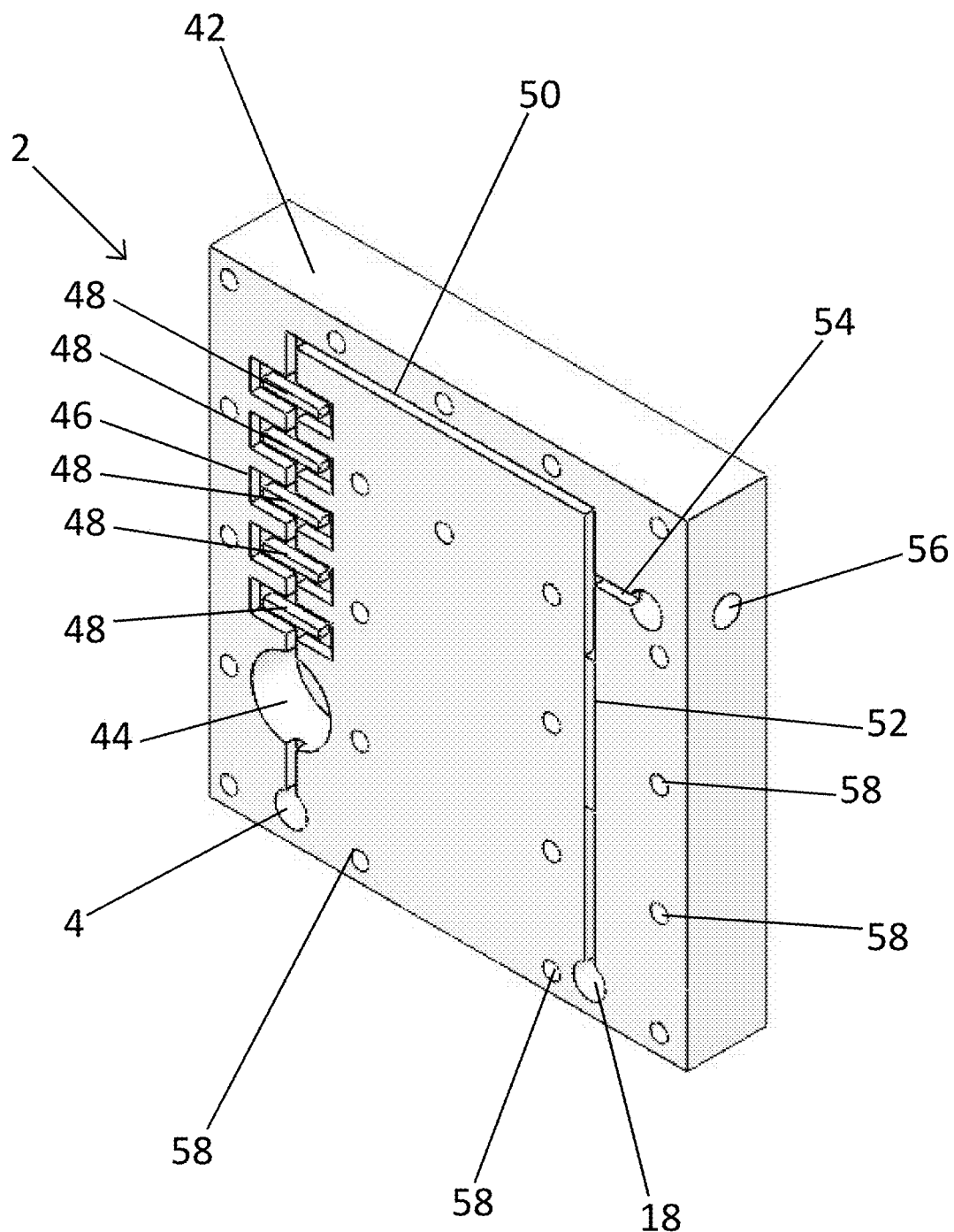
FIGS. 2a and 2b show perspective views of an oxygenation device according to an embodiment of the present invention.
Figure 2B:
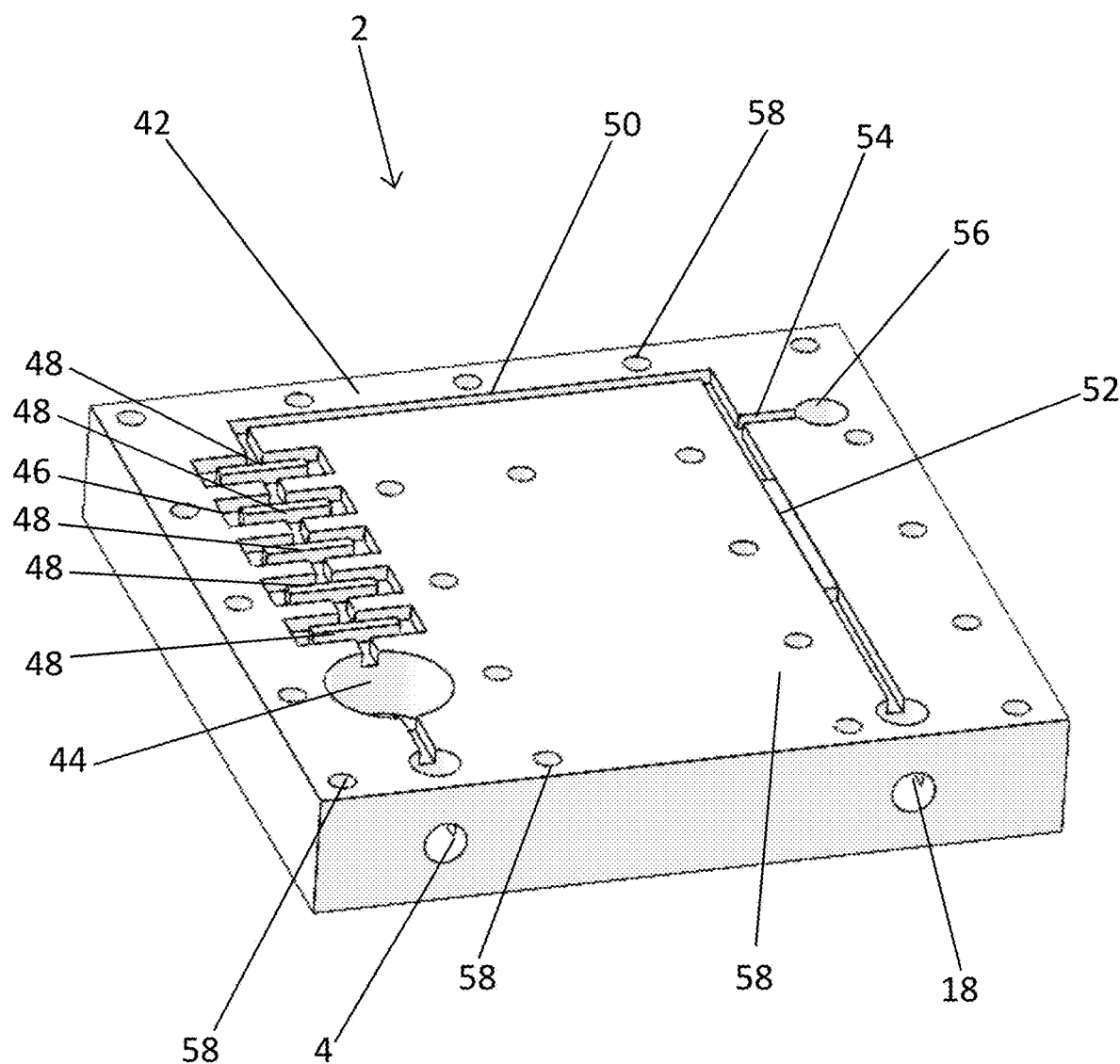
Figure 2C:
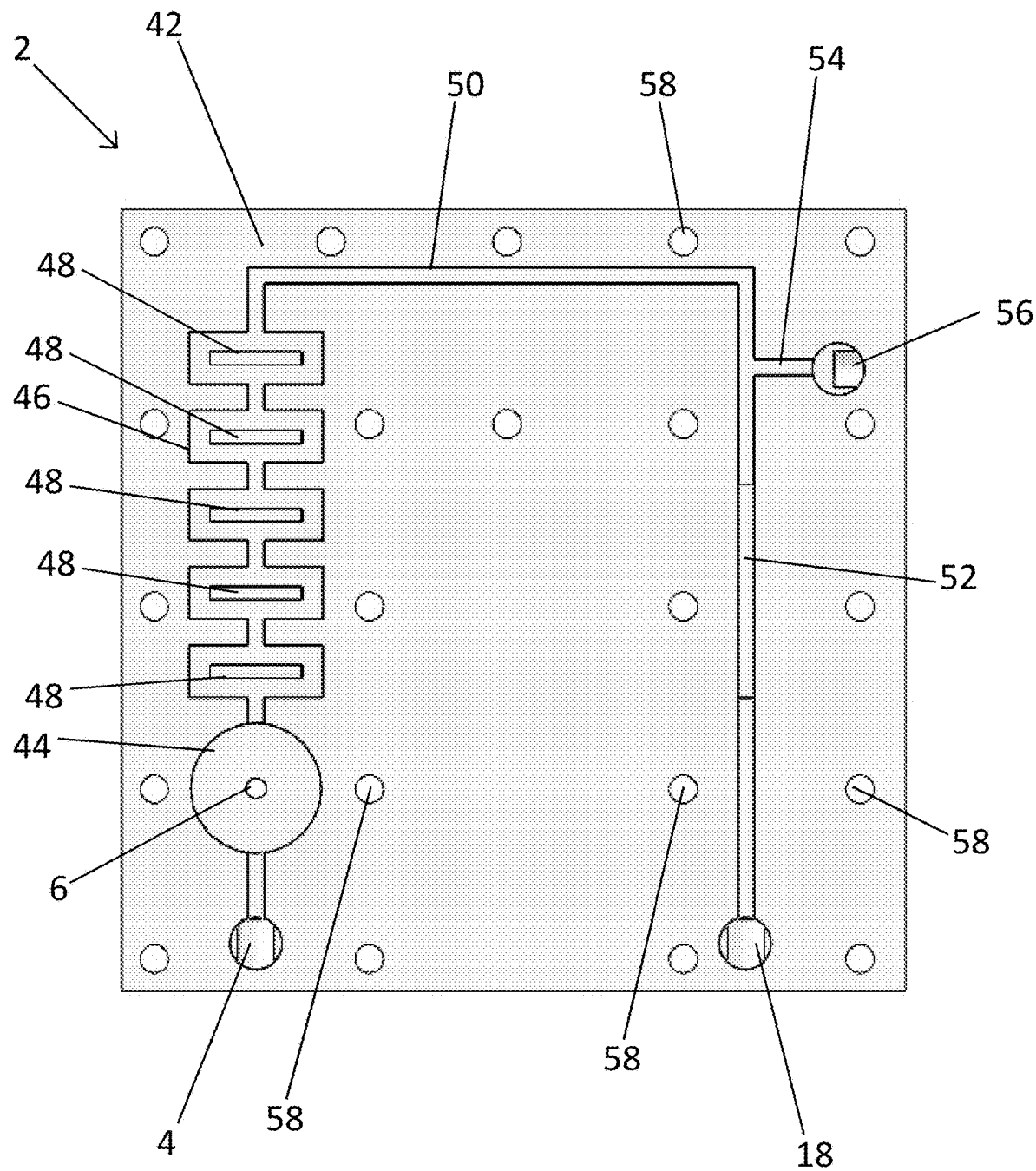
FIG. 2c shows a plan view of the oxygenation device shown in FIGS. 2a and 2b.

FIGS. 2a and 2b show perspective views of the oxygenation device 2 according to an embodiment of the present invention, and FIG. 2c shows a plan view of the oxygenation device 2 shown in FIGS. 2a and 2b. The oxygenation device 2 is made from a block of stainless steel 42 which has had the various components milled into its face using a CAD milling machine. The oxygenation device 2 has the liquid inlet 4 formed in a side of the stainless steel block 42 which is in fluid communication of a downstream cylindrical diffusion chamber 44. A conduit (not shown) is connected to the liquid inlet 4 to supply the liquid into the oxygenation device 2 from the liquid source via the pump 10. The oxygen inlet 6 is formed as a hole in the base of the diffusion chamber 44, i.e. through the rear of the stainless steel block 42. A conduit (not shown) is connected to the oxygen inlet 6 to supply the oxygen into the diffusion chamber 44 from the oxygen source.

Downstream of, and in fluid communication with, the diffusion chamber 44 is a mixing chamber 46 which comprises a series of baffles 48 to create a tortuous path for the liquid and oxygen flowing therethrough. A conduit 50 is provided downstream of, and in fluid communication with, the mixing chamber 46 to supply the liquid and oxygen to a venturi 52, which is formed as a narrowing of the conduit 50. Downstream of, and in fluid communication with, the venturi 52 is the outlet 18 for the oxygenated liquid, to which a conduit (not shown) is connected to supply to the oxygenated liquid to the bioreactor.

At a branch 54 off the conduit 50, a port 56 is formed in the stainless steel block 42 to which a pressure sensor (not shown) is connected, to measure the pressure of the liquid flowing through the conduit 50.

The stainless steel block 42 has a series of holes 58 drilled through its thickness which allow bolts to pass through to clamp a flat stainless steel cover (not shown) onto the stainless steel block 42 such that the various components of the stainless steel block 42 are enclosed and a flow path therethrough is formed. The heater (not shown) is arranged in good thermal contact with the rear of the stainless steel block 42 to heat the liquid supplied to the oxygenation device 2 via the liquid inlet 4.

Figure 3:
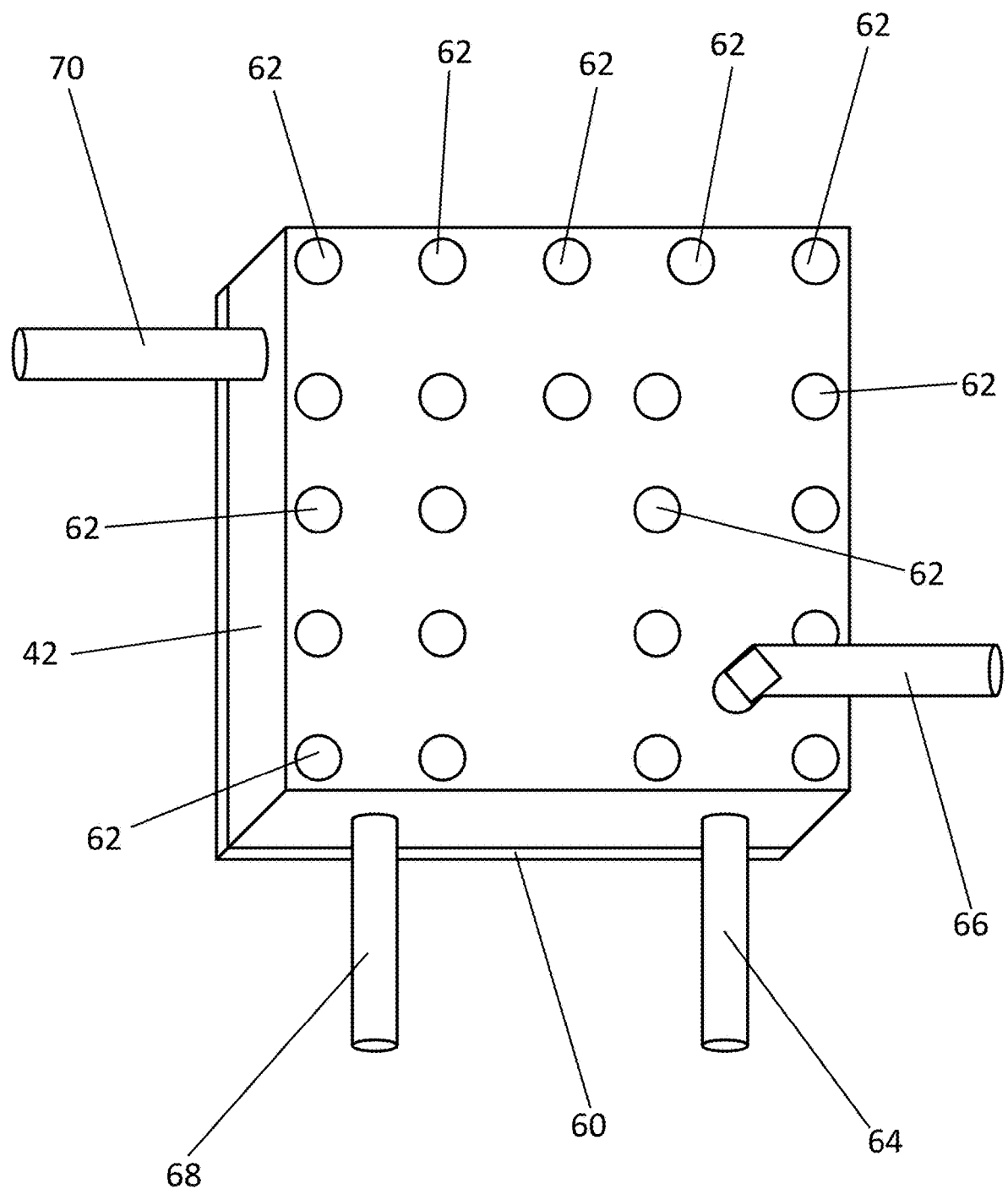
FIG. 3 shows a perspective view of the oxygenation device shown in FIGS. 2a, 2b and 2c.

FIG. 3 shows a perspective view from the reverse of the oxygenation device shown in FIGS. 2a, 2b and 2c. In FIG. 3 the stainless steel block 42 is shown with its stainless steel cover 60 attached using a number of bolts 62, which pass through the holes 58 shown in FIGS. 2a, 2b and 2c to clamp to stainless steel cover 60 to the stainless steel block 42 thereby forming the flow path through the oxygenation device.

Connected to the liquid inlet 4 (shown in FIGS. 2a, 2b and 2c) is a conduit 64 to supply the liquid into the oxygenation device from the liquid source via the pump 10. Connected to the oxygen inlet 6 (shown in FIGS. 2a, 2b and 2c) is a conduit 66 to supply the oxygen into the diffusion chamber 44 from the oxygen source. Connected to the outlet 18 (shown in FIGS. 2a, 2b and 2c) is a conduit 68 to supply to the oxygenated liquid to the bioreactor. Connected to the port 56 is a conduit 70 to which a pressure sensor (not shown) is connected, to measure the pressure of the liquid flowing through the conduit 50 of the oxygenation device (as shown in FIGS. 2a, 2b and 2c).

Operation of the device will now be described with reference to FIGS. 1, 2a, 2b, 2c and 3.

In order to supply oxygenated liquid to the bioreactor 20, the pump 10 is operated to pump liquid from the liquid source 8 into the oxygenation device 2 through the liquid inlet 4 via the conduit 64, and the valve on the pressurised gas canister of the oxygen source 14 is opened to supply oxygen to the oxygen inlet 6 via the conduit 66. The heater 16 is also energised to heat the liquid supplied to the oxygenation device 2 via the liquid inlet 4 to a temperature of approximately 37 degrees Celsius before it reaches the venturi 52. The temperature of the liquid flowing through the conduit 50 is measured by the temperature sensor 29, with the temperature measurements being sent via the wire 30 to the control 26. Based on the temperature measurements, the control 26 provides feedback control signals via the wire 38 to the heater 16 to control the power of the heater 16 so that the temperature of the liquid is kept constant at approximately 37 degrees Celsius.

The liquid enters the oxygenation device 2 via the liquid inlet 4 into the diffusion chamber 44, into which the oxygen is injected via the oxygen inlet 6. The cylindrical volume of the diffusion chamber 44 encourages the oxygen to mix with the liquid and the bubbles of oxygen to break up into smaller bubbles. The resultant liquid and oxygen mixture passes from the diffusion chamber 44 to the mixing chamber 46 where the series of baffles 48 create a tortuous path for the liquid and oxygen mixture which further breaks up the oxygen bubbles into even smaller bubbles.

After passing through the mixing chamber 46 the liquid and oxygen mixture passes along the conduit 50, and flows past the branch 54 off to the port 56 from where, via the conduit 68, the pressure of the liquid in the conduit 50 can be measured by the pressure sensor 32. The pressure measurements are then sent from the pressure sensor 32 to the control 26 via the wire 34. Based on the pressure measurements, the control 26 then provides feedback control signals via the wire 40 to the pump 10 to control the power of pump 10, i.e. pressure it delivers, so that the pressure can be kept at an appropriate level, e.g. 1 bar, both for the oxygenation of the liquid and for supplying the oxygenated liquid at the desired flow rate to the bioreactor 20.

Downstream of the conduit 50, the liquid and oxygen mixture passes through the venturi 52. The restriction the venturi 52 creates in the conduit causes the liquid and oxygen mixture to accelerate and then decelerate, creating a shockwave in the liquid and oxygen mixture which forces the oxygen to dissolve in the liquid, thus oxygenating the liquid.

The oxygenated liquid is output from the oxygenation device 2 through the outlet 18 and supplied to the bioreactor 20. As the oxygenated liquid passes from the outlet 18 to the bioreactor 20, the oxygen sensor 24 measures the concentration of dissolved oxygen in the oxygenated liquid and the flow meter 25 measures the flow rate of the oxygenated liquid being output from the oxygenation device 2. The dissolved oxygen concentration and flow rate measurements are sent from the oxygen sensor 24 and the flow meter 25 to the control 26 via the respective wires 28, 27. Based on the dissolved oxygen concentration and flow rate measurements the control 26 then sends control signals via the wires 36, 40 to the oxygen source 14 and/or the pump 10 respectively so that the amount of oxygen supplied into the oxygenation device 2 and/or the flow rate of the liquid through the oxygenation device 2 can be varied in order to optimise the dissolved oxygen concentration in the liquid output from the oxygenation device 2.

The oxygenated liquid is flowed through the bioreactor 20 where it is used for the culture of cells, for example, through the absorption of the oxygen in the liquid. After passing through the bioreactor 20 the liquid is returned to the oxygenation device 2 via a recycling conduit 22 and the pump 10 where it can be oxygenated again and recycled back to the bioreactor 20.

Figure 4A:
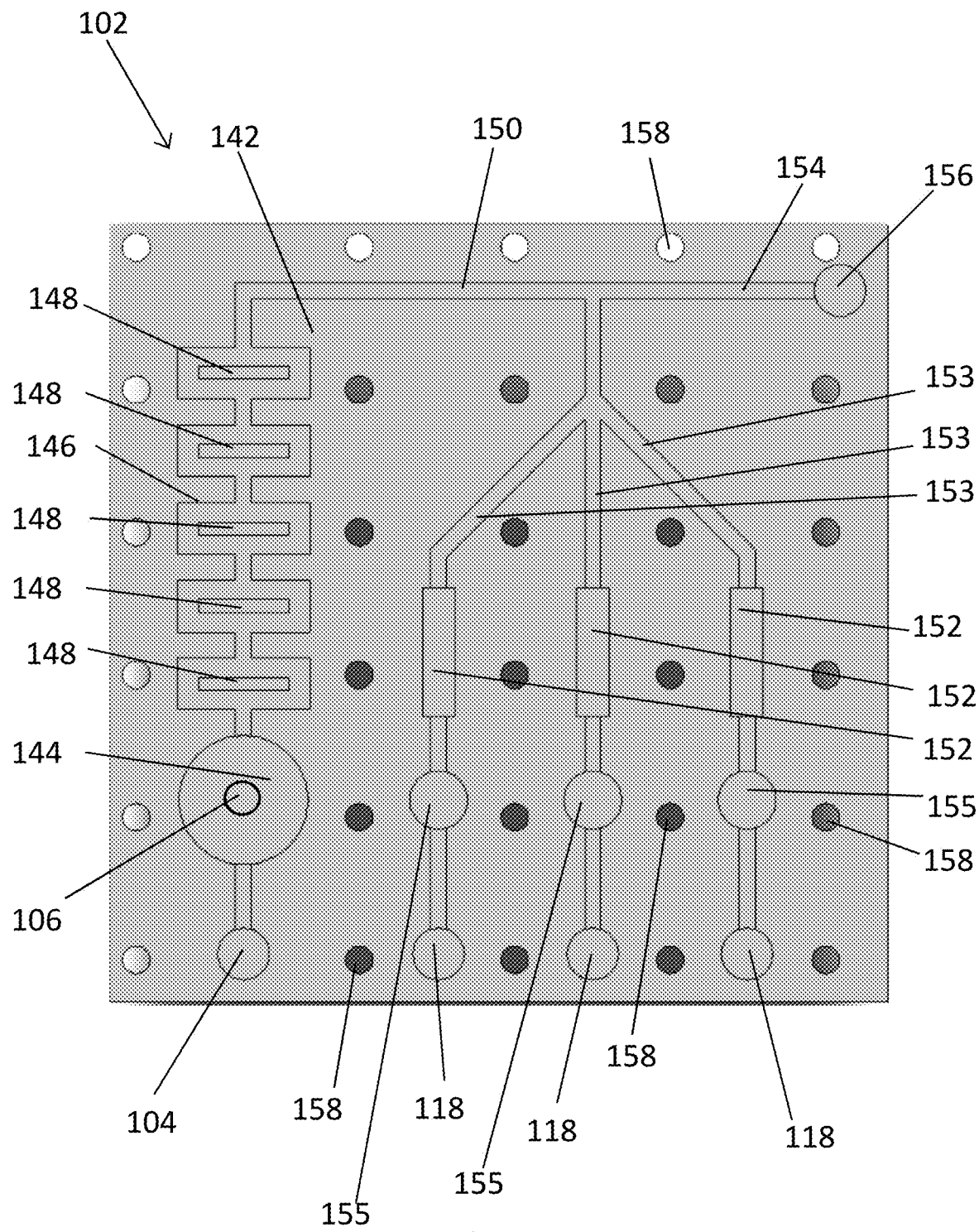
FIG. 4a shows a perspective view of an oxygenation device according to another embodiment of the present invention.
Figure 4B:
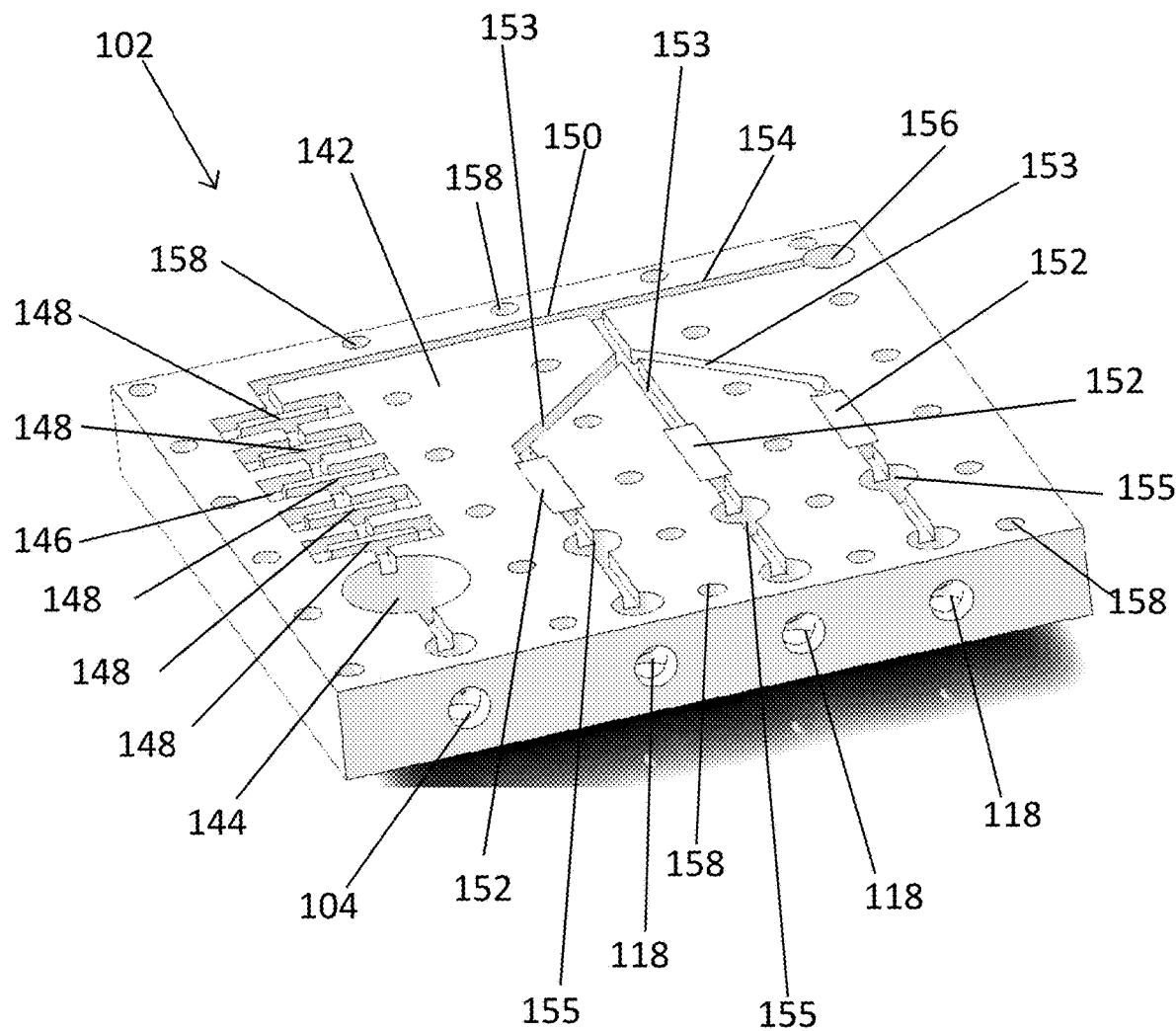

FIG. 4a shows a perspective view of an oxygenation device 102 according to another embodiment of the present invention, and FIG. 4c shows a plan view of the oxygenation device 102 shown in FIG. 4a. The oxygenation device 102 shown in FIGS. 4a and 4b is very similar to the oxygenation device 2 shown in FIGS. 2a, 2b, 2c and 3, i.e. it is made from a block of stainless steel 142 which has had the various components milled into its face using a CAD milling machine. The oxygenation device 102 has the liquid inlet 104 formed in a side of the stainless steel block 142 which is in fluid communication of a downstream cylindrical diffusion chamber 144. A conduit (not shown) is connected to the liquid inlet 104 to supply the liquid into the oxygenation device 102 from the liquid source via the pump. The oxygen inlet 106 is formed as a hole in the base of the diffusion chamber 144, i.e. through the rear of the stainless steel block 142. A conduit (not shown) is connected to the oxygen inlet 106 to supply the oxygen into the diffusion chamber 144 from the oxygen source.

Downstream of, and in fluid communication with, the diffusion chamber 144 is a mixing chamber 146 which comprises a series of baffles 148 to create a tortuous path for the liquid and oxygen flowing therethrough.

The difference in the oxygenation device 102 according to the embodiment shown in FIGS. 4a and 4b is that is comprises three venturis 152. A conduit 150 is provided downstream of, and in fluid communication with, the mixing chamber 146 to supply the liquid and oxygen the three venturis 152 via three conduits 153, which branch off from the initial conduit 150. The three venturis 152 are formed as a narrowing of their respective conduit 153.

Downstream of, and in fluid communication with, the venturis 152 are respective valves 155 which can be open and closed to allow or prevent respectively the oxygen and liquid passing through the respective venturis 152. Downstream of, and in fluid communication with, the valves 155 are respective outlets 118 for the oxygenated liquid, to which conduits (not shown) are connected to supply to the oxygenated liquid to the bioreactor.

At a branch 154 off the conduit 150, a port 56 is formed in the stainless steel block 142 to which a pressure sensor (not shown) is connected, to measure the pressure of the liquid flowing through the conduit 150.

The stainless steel block 142 has a series of holes 158 drilled through its thickness which allow bolts to pass through to clamp a flat stainless steel cover (not shown) onto the stainless steel block 142 such that the various components of the stainless steel block 142 are enclosed and a flow path therethrough is formed. The heater (not shown) is arranged in good thermal contact with the rear of the stainless steel block 142 to heat the liquid supplied to the oxygenation device 102 via the liquid inlet 104.

Operation of the oxygenation device 102 shown in FIGS. 4a and 4b is the same as for operation of the oxygenation device 2 shown in FIGS. 2a, 2b, 2c and 3, except the valves 155 downstream of the venturis 152 can be switched open or closed, either to allow or prevent liquid and oxygen flowing through the respective venturi 152. This therefore allows the flow rate of the oxygenated liquid produced by the oxygenation device 102 to be controlled.

Figure 5:
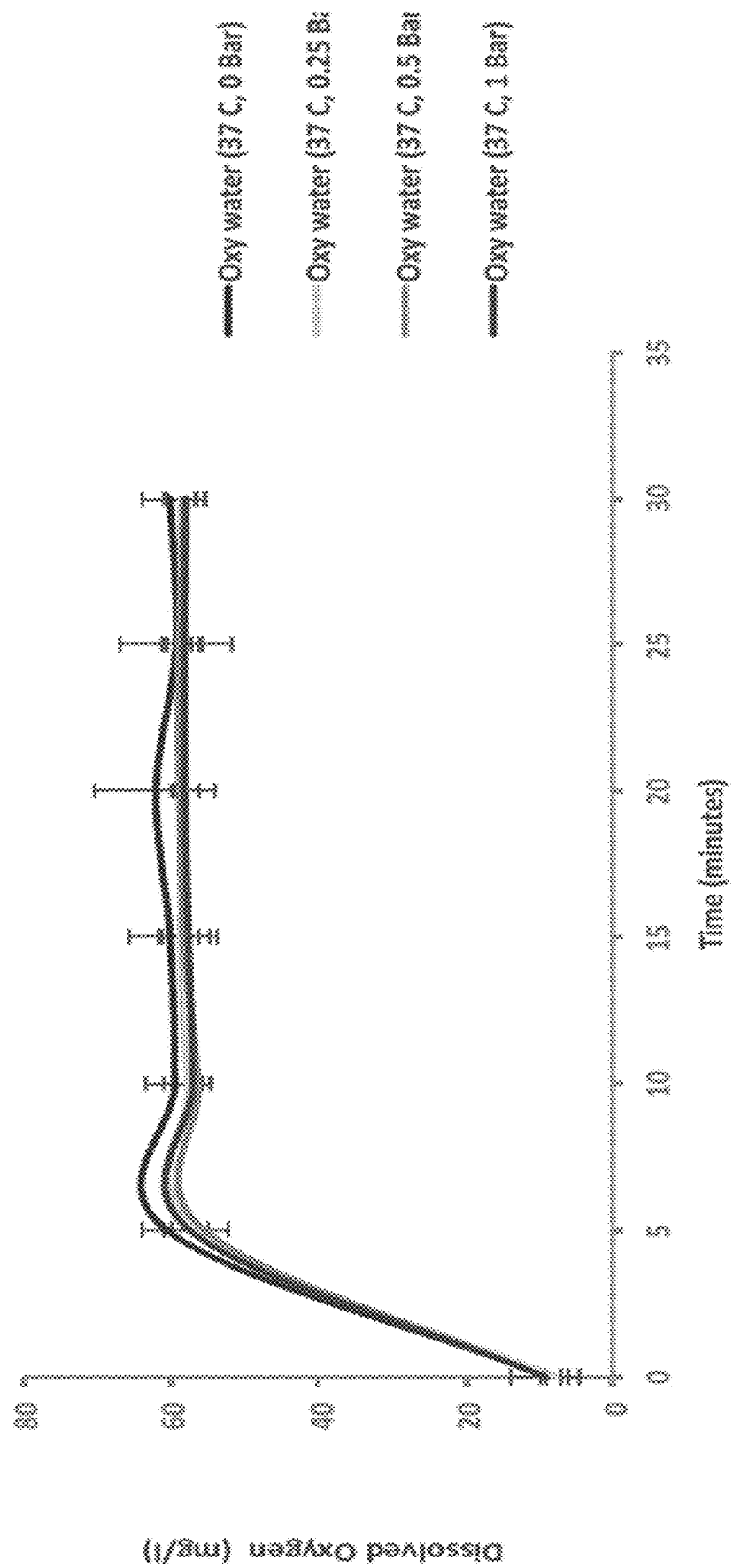
FIG. 5 shows a graph of the concentration of dissolved oxygen achieved by the embodiment of the oxygenation device shown in FIGS. 2a, 2b, 2c and 3.

FIG. 5 shows a graph of the concentration of dissolved oxygen, measured in the oxygenated liquid output from the oxygenation device 2 shown in FIGS. 2a, 2b, 2c and 3 during normal operation. The oxygenation device 2 was operated with the liquid heated to a temperature of 37 degrees Celsius and at four different pressures of the liquid flowing through the oxygenation device 2: 0 bar, 0.25 bar, 0.5 bar and 1 bar.

At a time point of 0 minutes, the graph of FIG. 5 shows the baseline concentration of dissolved oxygen measured before the liquid is passed through the oxygenation device 2. At a time point of 5 minutes, the pump 10 is energised and the liquid is flowed through the oxygenation device 2 to be oxygenated. As can be seen, once the operation of the oxygenation device 2 commences at the 5 minute point, steady state operation of the oxygenation device 2 is quickly reached, with the concentration of dissolved oxygen in the liquid being output from the oxygenation device 2 being approximately 60 mg/l.

Figure 6:
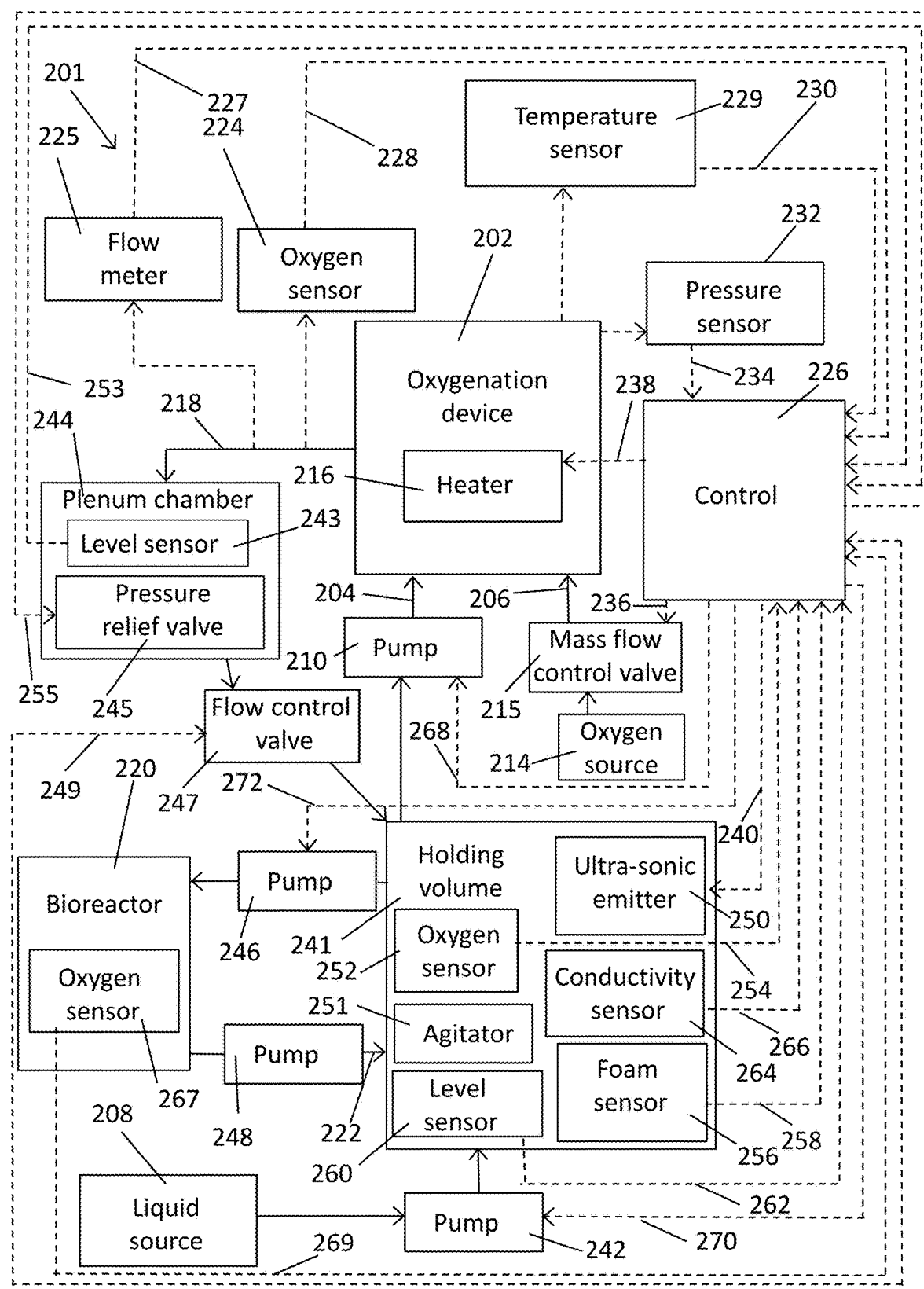
FIG. 6 shows a schematic diagram of a system including an apparatus according to another embodiment of the present invention which includes an oxygenation device.

FIG. 6 shows a schematic diagram of a system 201 according to another embodiment of the present invention, which is similar to the system shown in FIG. 1 but with the addition of a number of further components, as will be described. Solid lines indicate the flow of fluids, i.e. liquid or oxygen, through appropriate conduits, and dashed lines indicate the transfer of information, e.g. control signals.

The system 201 includes an oxygenation device 202 that has a liquid inlet 204 and an oxygen inlet 206. The oxygenation device 202 may comprise any suitable and desired oxygenation device, e.g. such as in one of the embodiments described with reference to FIGS. 2a and 2b, 3, or 4a and 4b. Liquid, e.g. cell culture media, is pumped into the liquid inlet 204 from a liquid source 208, e.g. a feeder tank, by a liquid inlet pump 210, e.g. a gear pump, via an intermediate holding volume 241, e.g. a glass container, into which the liquid is pumped from the liquid source 208 by a liquid inlet pump 242, e.g. a gear pump. Oxygen is supplied into the oxygen inlet 206 from an oxygen source 214, e.g. a pressurised gas canister of oxygen, with a mass flow control valve 215 controlling the supply of oxygen from the oxygen source 214 to the oxygen inlet 206.

The oxygenation device 202 includes a heater 216 arranged to heat the liquid supplied to the oxygenation device 202 via the liquid inlet 204, and an outlet 218 for oxygenated liquid. The outlet 218 supplies the oxygenated liquid to a plenum chamber 244, from where it is returned to the holding volume 241 via a flow control valve 247. The flow of liquid through the oxygenation device 202, the plenum chamber 244 and back to the holding volume 241 is driven by the pump 210 between the holding volume 241 and the oxygenation device 202, and controlled by the flow control valve 247 which sends flow control measurements to the control 226 via a wire 249. The plenum chamber 244 includes a pressure relief valve 245 arranged to vent excess gas pressure that builds up in the system 201 and a level sensor 243. The level sensor 243 send liquid level measurements to the control 226 via a wire 253 and the pressure relief valve 245 receives control signals from the control 226 via a wire 255.

The holding volume 241 is connected to a bioreactor 220 via an outlet pump 246, e.g. a gear pump, so that oxygenated liquid can be supplied to the bioreactor 220. Oxygenated liquid which has been used by the bioreactor 220 is returned to the holding volume via a recycling conduit 222 and a recycling pump 248, e.g. a gear pump. The holding volume 241 includes an ultra-sonic emitter 250 which is arranged to emit ultrasound waves into the holding volume 241, and an agitator 251 which is arranged to stir the liquid in the holding volume 241.

The system 201 includes an oxygen sensor 224 which is arranged to measure the concentration of dissolved oxygen in the oxygenated liquid output from the oxygenation device 202 through the outlet 218. The dissolved oxygen concentration measurements are sent to a control 226 via a wire 228. The system 201 also includes a flow meter 225 which is arranged to measure the flow rate of the oxygenated liquid output from the oxygenation device 202 through the outlet 218. The flow rate measurements are sent to the control 226 via a wire 227. The system 201 also includes a temperature sensor 229 which is arranged to measure the temperature of the liquid flowing through the oxygenation device 202, downstream of the heater 216. The temperature measurements are sent to the control 226 via a wire 230. The system 201 also includes a pressure sensor 232 which is arranged to measure the pressure of the liquid flowing through the oxygenation device 202. The pressure measurements are sent to the control 226 via a wire 234.

The holding volume 241 includes an oxygen sensor 252 which is arranged to measure the concentration of dissolved oxygen in the liquid in the holding volume 241. The dissolved oxygen concentration measurements are sent to the control 226 via a wire 254. The holding volume 241 also includes a foam sensor 256, e.g. a capacitive proximity sensor, which is arranged to detect the presence of foam in the holding volume 241. The foam measurements are sent to the control 226 via a wire 258. The holding volume 241 also includes a liquid level sensor 260, e.g. a capacitive proximity sensor, which is arranged to detect the level of the liquid in the holding volume 241. The liquid level measurements are sent to the control 226 via a wire 262. The holding volume 241 also includes a conductivity sensor 264, e.g. a continuity probe, which is arranged to measure the conductivity of the liquid in the holding volume 241. The conductivity measurements are sent to the control 226 via a wire 266.

The bioreactor 220 includes an oxygen sensor 267 which is arranged to measure the concentration of dissolved oxygen in the liquid in the bioreactor 220. The dissolved oxygen concentration measurements are sent to the control 226 via a wire 269.

The control is connected to the mass flow control valve 215 for the oxygen source 214, the heater 216, the ultrasonic emitter 250 and the pumps 210, 242, 246 by respective wires 236, 238, 240, 268, 270, 272 and is arranged to communicate with these components using control signals sent along the wires 236, 238, 240, 268, 270, 272.

Operation of the system 201 will now be described with reference to FIG. 6. The operation of the oxygenation device 202 is the same as for the oxygenation device described with reference to any of FIGS. 2a, 2b, 3, 4a and 4b.

In order to supply oxygenated liquid to the bioreactor 220, the inlet pump 242 between the liquid source 208 and the holding volume 241 is operated to pump liquid from the liquid source 208 into the holding volume 241. The level of the liquid in the holding volume 241 is measured by the liquid level sensor 260, with the liquid level measurements being sent to the control 226 via the wire 262. When the liquid level reaches a particular level, e.g. it reaches the level of the liquid level sensor 260, the control 226 issues a control signal via the wire 270 to stop the inlet pump 242. During operation of the system 201, the agitator 251 is operated to stir the liquid in the holding volume 241 to maintain its homogeneity.

Once the holding volume 241 contains an adequate reserve of the liquid, e.g. up to the level of the liquid level sensor 260, the pump 210 between the holding volume 241 and the oxygenation device 202 is operated to pump liquid from the holding volume 241 into the oxygenation device 202 through the liquid inlet 204, and the valve on the pressurised gas canister of the oxygen source 114 is opened to supply oxygen to the oxygen inlet 206. The heater 216 is also energised to heat the liquid supplied to the oxygenation device 202 via the liquid inlet 204 to a temperature of approximately 37 degrees Celsius before it reaches the venturi (52, FIGS. 2a, 2b) inside the oxygenation device 202. The temperature of the liquid flowing through the oxygenation device 202 is measured by the temperature sensor 229, with the temperature measurements being sent via the wire 230 to the control 226. Based on the temperature measurements, the control 226 provides feedback control signals via the wire 238 to the heater 216 to control the power of the heater 216 so that the temperature of the liquid in the oxygenation device 202 is kept constant at approximately 37 degrees Celsius.

The liquid is oxygenated by the oxygenation device 202, as described above with reference to any of FIGS. 2a, 2b, 3, 4a and 4b, with the pressure of the liquid in the oxygenation device 202 being measured by the pressure sensor 232. (The pressure measurements are then sent from the pressure sensor 232 to the control 226 via the wire 234. Based on the pressure measurements, the control 226 then provides feedback control signals via the wire 240 to the pump 210 to control the power of pump 210, i.e. pressure it delivers, so that the pressure can be kept at an appropriate level, e.g. 1 bar, for the oxygenation of the liquid.)

The oxygenated liquid is output from the oxygenation device 202 through the outlet 218 and supplied to the plenum chamber 244. As the oxygenated liquid passes from the outlet 218 to the plenum chamber 244, the oxygen sensor 224 measures the concentration of dissolved oxygen in the oxygenated liquid and the flow meter 225 measures the flow rate of the oxygenated liquid being output from the oxygenation device 202.

The dissolved oxygen concentration and flow rate measurements are sent from the oxygen sensor 224 and the flow meter 225 to the control 226 via the respective wires 228, 227. Based on the dissolved oxygen concentration and flow rate measurements the control 226 then sends control signals via the wires 236, 240 to the mass flow control valve 215 for the oxygen source 214 and/or the pump 210 respectively so that the amount of oxygen supplied into the oxygenation device 202 and/or the flow rate of the liquid through the oxygenation device 202 can be varied in order to optimise the dissolved oxygen concentration in the liquid output from the oxygenation device 202.

The oxygenated liquid flows through the plenum chamber 244, where liquid level measurements from the level sensor 243 (sent to the control 226 via the wire 253) are used by the control 226 to send control signals to the pressure relief valve 245 via the wire 255 to control the pressure in the plenum chamber 244. As a failsafe back-up, the pressure relief valve 245 opens if the pressure in the plenum chamber 244 exceeds a particular value to vent excess gas from the plenum chamber 244. The oxygenated liquid then flows back into the holding volume 241 via the flow control valve 247.

Flow control measurements from the flow control valve 247 (sent to the control 226 via the wire 249) and liquid level measurements from the level sensor 260 in the holding volume 241 (sent to the control 226 via the wire 262) are used by the control 226 to send control signals to the flow control valve 247 and the pump 210 (via the respective wires 249, 268) to control the level of liquid in the holding volume 241 (in combination with liquid being supplied to the holding volume 241 from the liquid source 208 and being supplied to the bioreactor 220).

Periodically, the oxygen sensor 252 in the holding volume 241 measures the concentration of dissolved oxygen in the liquid in the holding volume 241, with the dissolved oxygen concentration measurements being sent to the control 226 via the wire 254. When the oxygen concentration of the liquid in the holding volume 241 is measured to have reached a particular value, e.g. 70 mg/l, the control 226 sends a control signal via the wires 268, 238, 236 to the pump 210, the heater 216 and the mass flow control valve 215 for the oxygen source 214 respectively to cease operation of the oxygenation device 202, as the liquid in the holding volume 241 is now suitable for supplying to the bioreactor 220.

The oxygenated liquid is then pumped from the holding volume 241 to the bioreactor 220 by the outlet pump 246 between the holding volume 241 and the bioreactor 220, where the oxygenated liquid is used for the culture of cells, for example, through the absorption of the oxygen in the liquid. Periodically, the oxygen sensor 267 in the bioreactor 220 measures the concentration of dissolved oxygen in the liquid in the bioreactor 220, with the dissolved oxygen concentration measurements being sent to the control 226 via the wire 269. When the oxygen concentration of the liquid in the bioreactor 220 is measured to have fallen below a particular threshold, e.g. 50 mg/l, the control 226 sends a control signal via the wire 272 to the outlet pump 246, to supply more oxygenated liquid to the bioreactor 220. The outlet pump 246 is then operated to pump more oxygenated liquid from the holding volume 241 to the bioreactor 220.

At the same time, the recycling pump 248 is operated to return the liquid that has been used in the bioreactor 220 back to the oxygenation device 202 via a recycling conduit 222 where it can be oxygenated again (e.g. when the oxygen concentration of the liquid in the holding volume 241 is measured to have fallen below a particular concentration, e.g. 50 mg/l, by pumping it through the oxygenation device 202 until the oxygen concentration has been restored to its desired value, e.g. 70 mg/l) and recycled back to the bioreactor 220 when there is a further need for oxygenated liquid.

During operation of the system, the liquid level sensor 260 periodically measures the level of the liquid in the holding volume 241 to detect if the liquid level has fallen below a particular level. If the liquid level falls below the particular level, the control 226 issues a control signal via the wire 270 to operate the pump 242 to pump more liquid into the holding volume 241 from the liquid source 208, to maintain the liquid level in the holding volume 241 at a sufficient level to be able to fulfil further requests for oxygenated liquid from the bioreactor 220 (after having oxygenated the liquid by passing it through the oxygenation device 202).

During oxygenation of the liquid by the oxygenation device 202, foam may be produced in the liquid, e.g. when cell culture medium (particularly when containing a poloxamer) is being oxygenated. However, this is undesired as it may disrupt the culture of cells in the bioreactor 220. It is therefore beneficial to detect and to reduce any foam produced. Thus, the foam sensor 256 in the holding volume 241 periodically detects if there is any foam present in the holding volume 241, with the foam sensor measurements being sent to the control 226 via the wire 258. When foam is detected in the holding volume 241, e.g. above a particular threshold, the control 226 sends a control signal via the wire 240 to the ultra-sonic emitter 250, to emit ultrasound waves. The ultra-sonic emitter 250 is then operated to emit ultrasound waves into the holding volume 241 to reduce the foam therein, e.g. until the foam sensor 256 measures that the foam in the holding volume has been reduced, e.g. below a particular threshold.

Also during operation, the conductivity sensor 264 in the holding volume 241 periodically measures the conductivity of the liquid therein, with the conductivity measurements being sent to the control 226 via the wire 266. When the conductivity of the liquid is measured to have fallen below a particular threshold, e.g. indicating that the concentration of electrolytes in the liquid have been depleted, e.g. owing to them being consumed in the bioreactor 220, the control 226 sends a control signal via the wire 270 to operate the inlet pump 242 to pump more liquid into the holding volume 241 from the liquid source 208, in order to maintain the concentration of electrolytes in the liquid in the holding volume 241 at a sufficient level for use in the bioreactor 220 for the culture of cells (after having oxygenated the liquid by passing it through the oxygenation device 202).

It can be seen from the above that in at least preferred embodiments of the invention, an apparatus is provided that oxygenates a liquid passing through the apparatus for use in a downstream device such as a bioreactor. The use of a venturi in the apparatus to dissolve the oxygen into the liquid before it is supplied to the consuming device, e.g. a bioreactor, and the use of an ultra-sonic emitter to reduce any foam that is produced during the oxygenation of the liquid, provides an oxygenated liquid substantially without the presence of bubbles which disturb the cells in the bioreactor, for example, and a higher concentration of dissolved oxygen is achieved using the apparatus of the present invention compared with conventional sparging.

Providing the main components of the apparatus in the same integrally formed piece of material allows a compact apparatus to be provided that does not contain multiple individually manufactured components, i.e. which need to be connected together with tubes. Thus the apparatus can simply be connected between a liquid source, an oxygen source and the device to which the oxygenated liquid is being supplied, e.g. to provide an inline system.

Although the embodiments described above with reference to FIGS. 1 to 6 relate to the oxygenation of a liquid, it will be appreciated by the skilled person that any other suitable and desired gas, e.g. nitrogen, may be used instead of oxygen in order to dissolve the respective gas into the liquid and supply the liquid containing the dissolved gas to a downstream consuming device, e.g. a bioreactor. In these embodiments the system and apparatus is then very similar to the systems and apparatus outlined in the above embodiments, e.g. comprising many of the same components, but would comprise a gas, e.g. nitrogen, source instead of an oxygen source and the oxygenating device would be operated to dissolve the gas from the gas source into the liquid.

In some of these embodiments the other gas, e.g. nitrogen, may be used to de-oxygenate the liquid, e.g. by displacing the oxygen from the liquid. The system may therefore still comprise one or more oxygen sensors to determine the concentration of oxygen in the liquid at various respective points in the system so that these measurements may be used to control the system in a similar manner to that outlined above.

Figure 7:
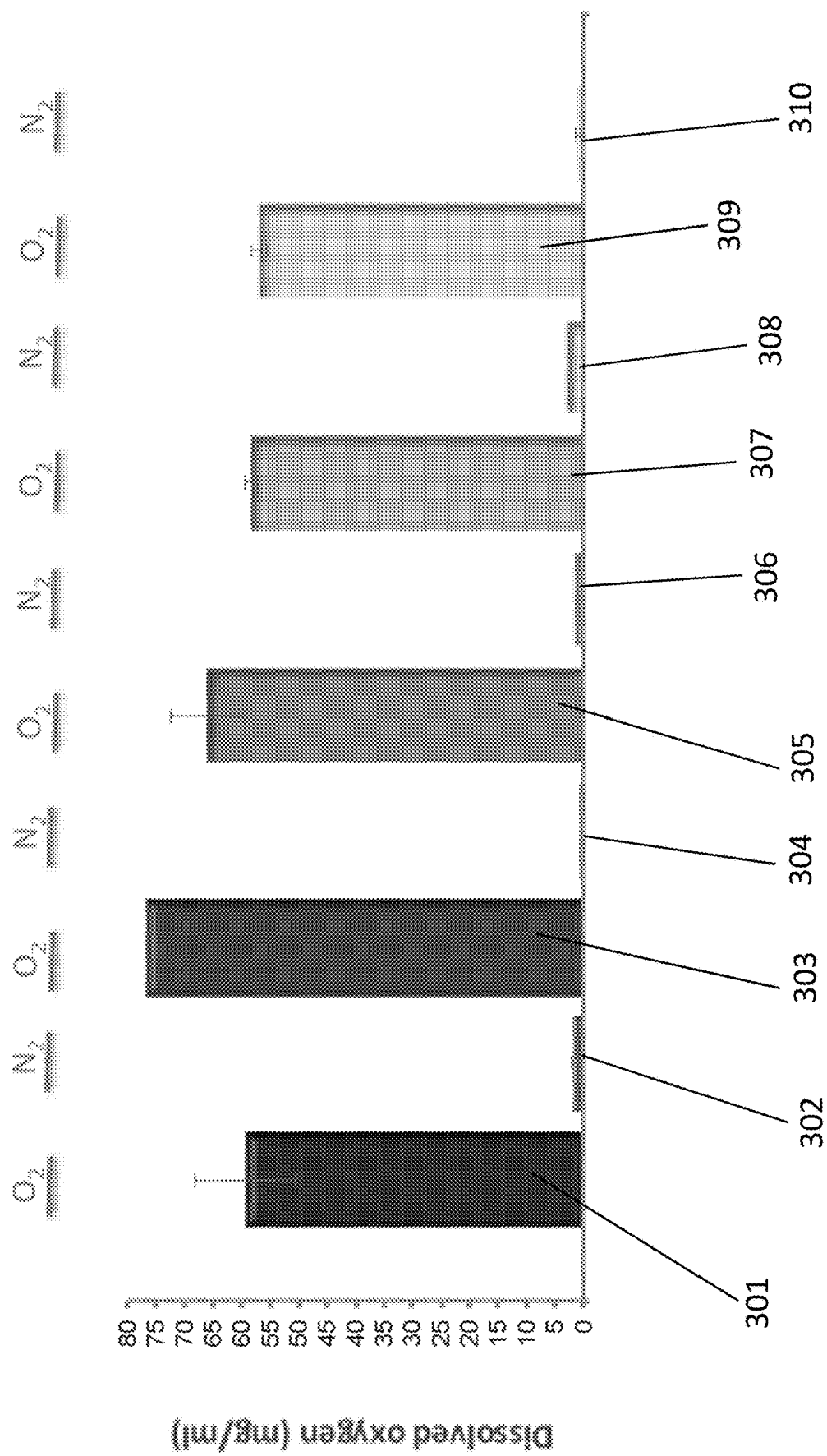
FIG. 7 shows a graph of the concentration of dissolved and depleted oxygen achieved by the embodiment of the oxygenation device shown in FIGS. 2a, 2b, 2c and 3.

FIG. 7 shows a graph of the concentration of dissolved oxygen achieved by the embodiment of the oxygenation device shown in FIGS. 2a, 2b, 2c and 3, when operating in different modes. This shows the effect of using either oxygen ($O_2$) or nitrogen ($N_2$) as the gas source into the apparatus, for either oxygenating or de-oxygenating the liquid respectively, when used with DMEM as the liquid having in it different concentrations of poloxamer.

When used with DMEM cell medium having no poloxamer therein and oxygen as the gas source, the oxygen concentration 301 achieved was approximately 60 mg/l. When used with DMEM having no poloxamer therein and nitrogen as the gas source, the oxygen concentration 302 was depleted to approximately 1 mg/l.

When used with DMEM having 1% poloxamer therein and oxygen as the gas source, the oxygen concentration 303 achieved was approximately 77 mg/l. When used with DMEM having 1% poloxamer therein and nitrogen as the gas source, the oxygen concentration 304 achieved was less than 1 mg/l.

When used with DMEM having 2% poloxamer therein and oxygen as the gas source, the oxygen concentration 305 achieved was approximately 66 mg/l. When used with DMEM having 2% poloxamer therein and nitrogen as the gas source, the oxygen concentration 306 achieved was approximately 1 mg/l.

When used with DMEM having 3% poloxamer therein and oxygen as the gas source, the oxygen concentration 307 achieved was approximately 59 mg/l. When used with DMEM having 3% poloxamer therein and nitrogen as the gas source, the oxygen concentration 308 achieved was approximately 2 mg/l.

When used with DMEM having 4% poloxamer therein and oxygen as the gas source, the oxygen concentration 309 achieved was approximately 58 mg/l. When used with DMEM having 4% poloxamer therein and nitrogen as the gas source, the oxygen concentration 310 was depleted to less than 1 mg/l.

Thus it will be appreciated that using the apparatus and/or system to dissolve nitrogen into the liquid is an effective way of de-oxygenating the liquid, for downstream uses that prefer liquid containing a low oxygen concentration.

The invention claimed is:

1. An apparatus for dissolving a gas into a liquid, the apparatus comprising:
    a liquid inlet for supplying the liquid into the apparatus;
    a liquid inlet pump in fluid communication with and upstream of the liquid inlet, wherein the liquid inlet pump is arranged to pump the liquid through the apparatus and deliver a flow rate of between 0.01 mL/min and 100 L/min;
    a gas inlet for injecting gas into the liquid within the apparatus, the gas inlet being in fluid communication with, and downstream of, the liquid inlet;
    a diffusion chamber in fluid connection with, and downstream of, the gas inlet, arranged such that the gas is injected through the gas inlet into the diffusion chamber, wherein the diffusion chamber is configured to promote break-up of the gas into a plurality of gas bubbles;
        wherein the diffusion chamber comprises a diffusion chamber inlet in fluid communication with and downstream of the liquid inlet, and a diffusion chamber outlet;
        wherein the diffusion chamber inlet and diffusion chamber outlet extend along an axis perpendicular to the gas inlet;
        wherein the diffusion chamber has a circular cross-section in a plane that is perpendicular to the gas inlet and that is parallel to the axis of the diffusion chamber inlet and diffusion chamber outlet;
    a venturi in fluid communication with, and downstream of, the diffusion chamber outlet, wherein the venturi is configured to dissolve the gas into the liquid passing through the venturi; and
    an outlet for the liquid and dissolved gas in fluid communication with, and downstream of, the venturi, the outlet for the liquid and dissolved gas being configured to supply the liquid and dissolved gas to a downstream consuming device;
    wherein at least part of the liquid inlet, at least part of the gas inlet, at least part of the venturi, and at least part of the outlet are integrally formed as a unitary piece of material.

2. An apparatus as claimed in claim 1, wherein:
    the apparatus comprises a holding volume in fluid communication with and downstream of the outlet for the liquid and dissolved gas; and
    the holding volume comprises a holding volume liquid inlet in fluid communication with a liquid source for supplying liquid into the holding volume.

3. An apparatus as claimed in claim 2, wherein:
    the apparatus comprises a liquid source pump in fluid communication with, and downstream of, the liquid source; and the liquid source pump is arranged to pump liquid from the liquid source to the holding volume.

4. An apparatus as claimed in claim 3, wherein:
the holding volume comprises a level sensor arranged to measure a level of the liquid in the holding volume; and
the level sensor is arranged to provide feedback to the liquid source pump.

5. An apparatus as claimed in claim 3, wherein:
the holding volume comprises a conductivity sensor arranged to measure conductivity of the liquid in the holding volume; and
the conductivity sensor is arranged to provide feedback to the liquid source pump.

6. An apparatus as claimed in claim 1, wherein:
the apparatus comprises a holding volume in fluid communication with and downstream of the outlet for the liquid and dissolved gas, and an inlet pump in fluid communication with, and upstream of, the liquid inlet of the apparatus, and in fluid communication with, and downstream of, the holding volume; and
the inlet pump is arranged to pump the liquid from the holding volume to the liquid inlet of the apparatus and to pump the liquid through the apparatus.

7. An apparatus as claimed in claim 6, wherein:
the holding volume comprises an oxygen sensor arranged to measure a concentration of dissolved oxygen in the liquid in the holding volume; and
the oxygen sensor is arranged to provide feedback to the inlet pump.

8. An apparatus as claimed in claim 1, wherein:
the apparatus comprises a holding volume in fluid communication with and downstream of the outlet for the liquid and dissolved gas, and the downstream consuming device;
the holding volume is in fluid communication with an inlet of the downstream consuming device such that liquid can be supplied from the holding volume to the downstream consuming device.

9. An apparatus as claimed in claim 8, wherein the apparatus comprises an outlet pump in fluid communication with, and downstream of, the holding volume, which is arranged to pump liquid from the holding volume to the downstream consuming device.

10. An apparatus as claimed in claim 9, wherein:
the downstream consuming device comprises an oxygen sensor arranged to measure a concentration of dissolved oxygen in the liquid in the downstream consuming device; and
the oxygen sensor in the downstream consuming device is arranged to provide feedback to the outlet pump.

11. An apparatus as claimed in claim 1, wherein:
the apparatus comprises a holding volume in fluid communication with, and downstream of, the outlet for the liquid and dissolved gas; and
the holding volume comprises a vent in fluid communication with an atmosphere outside of the holding volume.

12. An apparatus as claimed in claim 1, wherein:
the apparatus comprises a holding volume in fluid communication with, and downstream of, the outlet for the liquid and dissolved gas; and
the holding volume comprises an agitator for stirring the liquid in the holding volume.

13. An apparatus as claimed in claim 1, wherein the apparatus comprises a foam reducing element configured to partially disperse and/or prevent formation of foam in the liquid; and the foam reducing element is selected to be one or more of: an ultrasonic emitter, a vent, a valve between the gas source and gas inlet, a valve between the outlet for the liquid and dissolved gas and the holding volume.

14. An apparatus as claimed in claim 13, wherein:
the apparatus comprises a holding volume in fluid communication with, and downstream of, the outlet for the liquid and dissolved gas; and
the holding volume comprises the foam reducing element.

15. An apparatus as claimed in claim 13, wherein:
the apparatus comprises a holding volume in fluid communication with, and downstream of, the outlet for the liquid and dissolved gas; and
the foam reducing element comprises an ultra-sonic emitter arranged to emit ultrasound waves into the holding volume.

16. An apparatus as claimed in claim 13, wherein:
the apparatus comprises a holding volume in fluid communication with, and downstream of, the outlet for the liquid and dissolved gas; and
the holding volume comprises a foam sensor arranged to detect presence of foam in the holding volume; and
the foam sensor is arranged to provide feedback to the foam reducing element.

17. An apparatus as claimed in claim 1, wherein the apparatus comprises a vent configured to allow venting of excess gas from the apparatus.

18. An apparatus as claimed in claim 17, wherein:
the vent comprises a plenum chamber downstream of the outlet for the liquid and dissolved gas; and
the plenum chamber comprises a pressure relief valve for venting excess gas from the apparatus.

19. An apparatus as claimed in claim 18, wherein:
the apparatus comprises a pressure sensor arranged to measure pressure of the liquid in the apparatus; and
the pressure sensor is arranged to provide feedback to the pressure relief valve.

20. An apparatus as claimed in claim 4, wherein the apparatus comprises one or more of the following items (i) to (vi):
(i) a pressure sensor arranged to measure the pressure of the liquid in the apparatus;
(ii) a foam sensor arranged to detect the presence of foam in the holding volume;
(iii) a liquid source pump in fluid communication with and downstream of the liquid source, which is arranged to pump liquid from the liquid source to the holding volume;
(iv) an outlet pump in fluid communication with and downstream of the holding volume, which is arranged to pump liquid from the holding volume to the downstream consuming device;
(v) a foam reducing element configured to partially disperse and/or prevent formation of foam in the liquid; and
(vi) a pressure relief valve for venting excess gas from the apparatus;
wherein the holding volume comprises one or more of: a conductivity sensor arranged to measure the conductivity of the liquid in the holding volume, and an oxygen sensor arranged to measure the concentration of dissolved oxygen in the liquid in the holding volume; and
wherein the downstream consuming device comprises an oxygen sensor arranged to measure the concentration of dissolved oxygen in the liquid; and wherein the apparatus further comprises a control configured to receive signals from one or more of the level sensor, the conductivity sensor, the oxygen sensor arranged to measure the concentration of dissolved oxygen in the liquid in the holding volume, the oxygen sensor in the downstream consuming device, the foam sensor, or the pressure sensor, and configured to send feedback control signals to one or more of: the liquid source pump, the outlet pump, the foam reducing element, and the pressure relief valve; and the foam reducing element is selected to be one or more of: an ultrasonic emitter, a vent, a valve between the gas source and gas inlet, a valve between the outlet for the liquid and dissolved gas and the holding volume.

\* \* \* \* \*